US011169055B2

(12) United States Patent
Therkorn et al.

(10) Patent No.: US 11,169,055 B2
(45) Date of Patent: Nov. 9, 2021

(54) PARTICULATE AIR SAMPLING USING FERROELECTRIC MATERIALS

(71) Applicant: Rutgers, The State University of New Jersey, New Brunswick, NJ (US)

(72) Inventors: Jennifer Therkorn, Milltown, NJ (US); Gediminas Mainelis, North Brunswick, NJ (US); Jerry I. Scheinbeim, Princeton, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 415 days.

(21) Appl. No.: 15/762,851

(22) PCT Filed: Sep. 23, 2016

(86) PCT No.: PCT/US2016/053329
§ 371 (c)(1),
(2) Date: Mar. 23, 2018

(87) PCT Pub. No.: WO2017/053717
PCT Pub. Date: Mar. 30, 2017

(65) Prior Publication Data

US 2018/0266922 A1 Sep. 20, 2018

Related U.S. Application Data

(60) Provisional application No. 62/334,118, filed on May 10, 2016, provisional application No. 62/222,857, filed on Sep. 24, 2015.

(51) Int. Cl.
*G01N 1/22* (2006.01)
*B03C 3/017* (2006.01)
(Continued)

(52) U.S. Cl.
CPC ........... *G01N 1/2202* (2013.01); *B03C 3/017* (2013.01); *B03C 3/28* (2013.01); *B03C 3/32* (2013.01);
(Continued)

(58) Field of Classification Search
CPC ...... G01N 1/2202; G01N 1/2273; G01N 1/26; G01N 2001/2276; G01N 2001/4038;
(Continued)

(56) References Cited

U.S. PATENT DOCUMENTS

| | | | |
|---|---|---|---|
| 8,539,840 | B2 | 9/2013 | Ariessohn et al. |
| 2013/0240434 | A1 | 9/2013 | Yaeger |
| 2014/0373717 | A1 | 12/2014 | Wang |

FOREIGN PATENT DOCUMENTS

WO WO-2013097375 A1 * 7/2013 ............... B03C 3/41

* cited by examiner

*Primary Examiner* — Robert J Eom
(74) *Attorney, Agent, or Firm* — Fox Rothschild LLP

(57) ABSTRACT

A passive and active sampler for airborne particulate sampling (especially particles of biological origin) and a method of using same are disclosed. The sampler includes a sampler base portion of variable size and shape having a longitudinal body and an inner surface. The sampler base portion is configured with a plurality of air channels having variable air channel spacing therethrough the longitudinal body. A plurality of layers of ferroelectric film have a first side and a second side polarized by application of an external electric field such that the first side produces a negative electric field at a first surface and the second side produces a positive electric field at a second surface. The plurality of layers of polarized, ferroelectric film are disposed thereon the longitudinal body with their opposite polarization directions facing each other across a fixed air gap to collect both charged and uncharged particles. The use of such technology as an electrostatic precipitator for active sampling of air-
(Continued)

borne particulates and a method of using same are further disclosed. This electrostatic precipitator technology can be used for bioaerosol or general particle filtration, as in HVAC systems.

7 Claims, 18 Drawing Sheets

(51) Int. Cl.

| | |
|---|---|
| ***B03C 3/28*** | (2006.01) |
| ***F23J 15/02*** | (2006.01) |
| ***B03C 3/32*** | (2006.01) |
| ***G01N 1/26*** | (2006.01) |
| ***G01N 1/40*** | (2006.01) |

(52) U.S. Cl.
CPC ............ *F23J 15/02* (2013.01); *G01N 1/2273* (2013.01); *G01N 1/26* (2013.01); *B03C 2201/24* (2013.01); *F23J 2217/102* (2013.01); *G01N 2001/2223* (2013.01); *G01N 2001/2276* (2013.01); *G01N 2001/4038* (2013.01)

(58) Field of Classification Search
CPC .. B03C 3/017; B03C 3/28; B03C 3/32; B03C 2201/24; F23J 15/02; F23J 2217/102
See application file for complete search history.

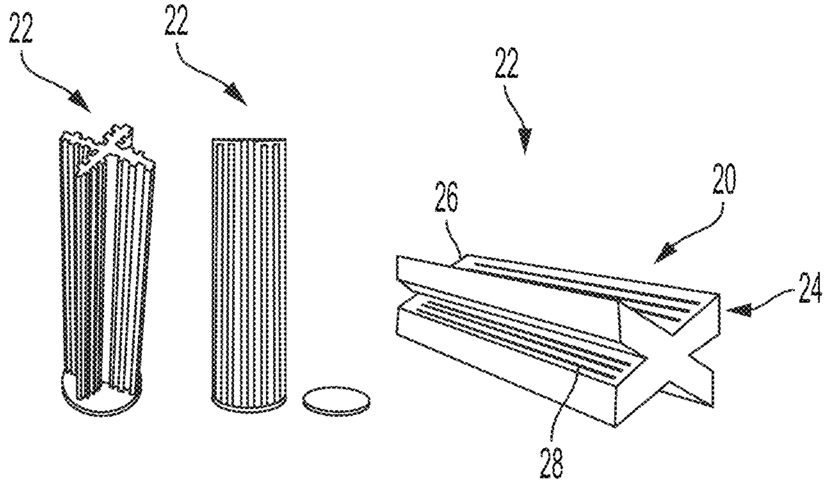
FIG. 2A
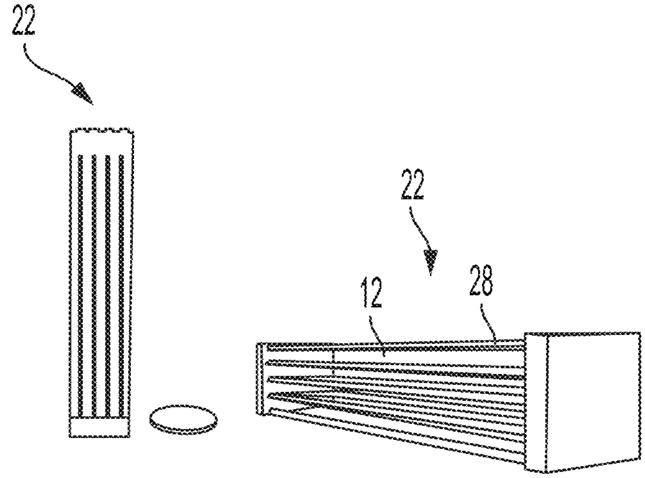
FIG. 2B
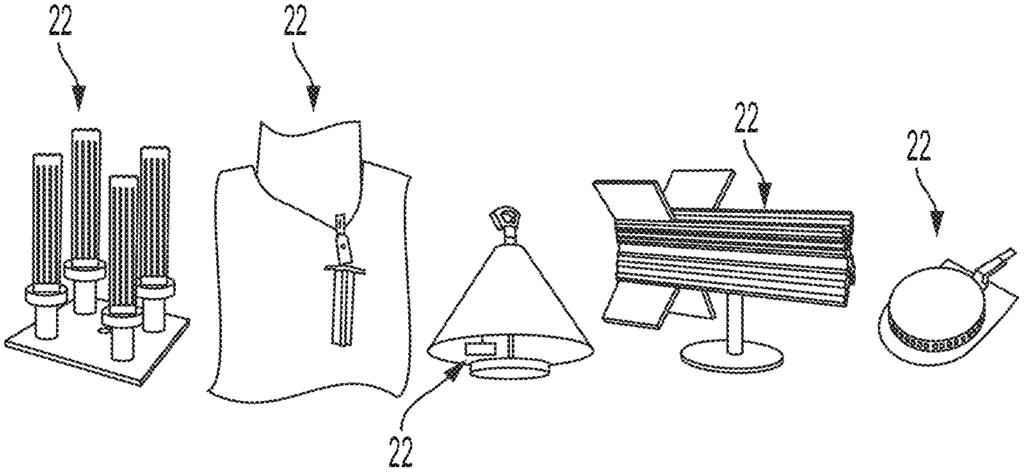

PARTICULATE AIR SAMPLING USING FERROELECTRIC MATERIALS

CROSS-REFERENCE TO RELATED APPLICATIONS

This application is a U.S. National Phase of International Application No. PCT/US2016/053329, filed Sep. 23, 2016, which claims the benefit of U.S. Provisional Application No. 62/222,857, filed Sep. 24, 2015, and U.S. Provisional Application No. 62/334,118, filed May 10, 2016. The applications are herein incorporated by reference in their entireties.

STATEMENT OF GOVERNMENT LICENSE RIGHTS

The present disclosure was made with government support. The United States government may have certain rights in this invention.

TECHNICAL FIELD

The present disclosure relates to the field of air quality monitoring, sampling, and collection devices, and more particularly, to passive and active sampling and collection of airborne particulate matter, i.e., aerosol or bioaerosol sampling and detection, and methods of using same.

BACKGROUND

Bioaerosol (biological aerosol) samplers are air quality monitoring devices that may be used to collect airborne particles of biological origin, such as viruses, bacteria, mold spores, pollen and their agglomerates and aggregates. Such samplers will collect non-biological particulate matter as well. The ability to widely and easily deploy air samplers that can provide representative data on airborne particles, including bacteria, mold and pollen, in a given indoor or outdoor environment is necessary to protect public health. Bioaerosol is ubiquitous indoors and outdoors resulting in a wide spectrum of potential adverse environmental and health effects. For example, bioaerosols cause issues like allergies, asthma, infectious disease spread and livestock and agricultural loss. Released biowarfare agents are also examples of bioaerosols. Other types of airborne particulate matter also contribute to inflammatory airway diseases and heart disease.

The broad ranging environmental and health impacts of bioaerosol and other non-biological airborne particulate matter call for practical, widely deployable, quantitative environmental monitoring and exposure assessment systems. In order to achieve these environmental monitoring capabilities, there needs to be further development of both active and passive bioaerosol sampling technologies. The use of electrostatic collection mechanisms is particularly appealing for development of active and passive bioaerosol sampling technology. Airborne biological particles carry relatively high electrical charge compared to other types of airborne particles due to the way in which they become airborne and their natural metabolic activity. Thus, electrostatic precipitator (ESP) type samplers (active and passive) have unique potential in the fields of aerobiology and bioaerosol sampling.

Typical airborne particle samplers, including bioaerosol samplers, are "active" samplers, i.e., they require a pump or other air movers to pull air through sample media. The need for air sampling pumps leads to high costs, limited sampling durations, reduced sampler deployability and sample degradation as pulling air with a pump can dry out and/or damage samples, especially those of biological origin. There are different types of active bioaerosol/aerosol samplers available, including impactors, liquid impingers, filter-based samplers and ESPs. It is necessary for different types of these samplers to exist as there is no single aerosol/bioaerosol sampler that can be used to fully characterize all properties of an aerosol sample, including the full particle size range and all chemical/physical/biological properties, and these samplers are designed to be used in different environments, or different sampling applications and for different analysis methods. ESPs, specifically, are an important tool in airborne particle sampling because they are the only type of air sampler that can collect nano-sized particles with very high particulate collection efficiencies, and can efficiently remove a large number of particles from a particulate laden airstream with low pressure losses. Such instruments are widely used in industrial applications and/or removal of particles from large spaces. When used in a fixed location they typically are not amenable to design modification after installation. Small ESPs for environmental and personal monitoring are only beginning to emerge. Also, in traditional ESPs, the particles in the incoming airstream must be electrically charged, which leads to the production of ozone, a respiratory irritant.

Most of the currently available passive bioaerosol/aerosol samplers or sampler concepts (e.g., electrostatic dust cloths, settling plates, Personal Aero-Allergen Sampler, Wagner-Leith Sampler, Einstein-Lioy Deposition Sampler, electret, sticky foils, etc.) have significant issues, including as follows: such samplers have been found to have difficulty in collecting particles smaller than 5 μm diameter; do not collect enough particles to overcome microbial analysis limits of detection (LODs); are extremely burdensome and impractical to set up, use and dismantle for analysis; have uniquely designed sampler components that cannot be easily acquired due to the way in which the prototypes are made; require extensive and expensive microscopy analysis with software; or some combination of the above.

Accordingly, a need exists for bioaerosol samplers that are compact, easy to manufacture with flexibility in sampler size and shape, and do not require a device to pull air through the sample media. There is also a need in the bioaerosol sampling field for samplers that utilize a more gentle method to deposit airborne microorganisms onto collection surfaces without affecting their properties that enable their identification and enumeration, e.g., without detrimental effect on culturability or DNA integrity. Typical ESPs impart a high electrostatic charge on the particles in the incoming airstream by applying a high voltage to an electrode which leads to an electric corona discharge which ionizes the gas around the electrode; this maximizes particle collection as they are then attracted to the grounded collection surface. This has major drawbacks depending on the sampling application as the microorganism's culturabilities may be damaged and inactivated by ions and ozone during charging. Also, all traditional ESPs require power to the particle charging (ionizing) and collection (precipitation) zones. It would thus be desirable to have both a passive and an active particulate air sampler for bioaerosol sampling and methods of using same, which avoid the disadvantages of the known apparatus and methods.

SUMMARY

In a first aspect, there is provided herein a passive particulate air sampler for airborne particulate sampling.

The sampler includes a sampler base portion of variable size and shape having a longitudinal body and an inner surface. The sampler base portion is configured with a plurality of air channels having variable air channel spacing therethrough the longitudinal body. A plurality of layers of ferroelectric film having a first side and a second side polarized by application of an external electric field such that the first side produces a negative electric field at a first surface and the second side produces a positive electric field at a second surface. The plurality of layers of polarized, ferroelectric film are disposed thereon the longitudinal body with their opposite polarization directions facing each other across a fixed air gap to collect both charged and uncharged particles.

In certain embodiments, the plurality of layers of polarized, ferroelectric film are disposed on the inner surface of the sampler base portion in a spiral orientation with optimal air gap spacing between each layer.

In certain embodiments, the plurality of layers of polarized, ferroelectric film have a parallel orientation when disposed on the inner surface of the sampler body portion having a lattice configuration.

In certain embodiments, the plurality of layers of polarized, ferroelectric film are uniaxially oriented poly(vinylidene fluoride) (PVDF) or its copolymers with trifluoroethylene, or other ferroelectric materials, such as ceramic and composite ferroelectric materials.

In certain embodiments, the air channel spacing is optimally set between 2 mm and 3 mm for improved charged particle collection. Other air channel widths could also be used.

In certain embodiments, the sampler base portion is manufactured by 3D printing or injection molding.

In certain embodiments, the sampler is configured for use individually or grouped together as a unit indoors and outdoors or the sampler is configured to be worn as a personal sampler.

In a second aspect, there is provided herein a sampler base portion for passive particulate air sampling. The sampler base portion includes a longitudinal body of variable shape and size with an inner surface. The longitudinal body includes a plurality of air channels with variable air channel spacing therethrough. The longitudinal body is configured to receive a plurality of layers of ferroelectric film disposed thereon. The plurality of layers of ferroelectric film have a first side and a second side polarized by application of an external electric field such that the first side produces a negative electric field at a first surface and the second side produces a positive electric field at a second surface with their opposite polarization directions facing each other across a fixed air gap to collect both charged and uncharged particles.

In certain embodiments, the longitudinal body has a spiral configuration such that the plurality of layers of polarized, ferroelectric film are wrapped therearound with optimal air gap spacing between each layer.

In certain embodiments, the longitudinal body has a lattice configuration such that the plurality of layers of polarized, ferroelectric film are disposed thereon in a parallel orientation.

In a third aspect, there is provided herein an electrostatic precipitator for active sampling, or collection for filtration purposes, of airborne particulates. The electrostatic precipitator includes a sampler base portion of variable size and shape having a longitudinal body and an inner surface. The sampler base portion is configured with a plurality of air channels having variable air channel spacing therethrough the longitudinal body. One or multiple sheet(s) of ferroelectric film having no electrodes is/are positioned on the longitudinal body such that the film's surfaces face each other across a fixed air gap, or, at least two sheets of polarized, ferroelectric film are positioned on the longitudinal body such that their opposite polarization directions face each other across the fixed air gap, to collect both charged and uncharged particles. An air mover disposed outside the sampler base portion is configured to pull or push air from an ambient environment and move air through the plurality of air channels during collection of the charged and uncharged particles.

In certain embodiments, the ferroelectric film or materials has/have a parallel layer orientation when positioned on the inner surface of the sampler body portion having a lattice configuration.

In certain embodiments, the ferroelectric film or materials are polarized, uniaxially oriented poly(vinylidene fluoride) (PVDF) or its copolymers with trifluoroethylene, or other ferroelectric materials, such as ceramic and composite ferroelectric materials.

In certain embodiments, the air channel spacing is optimally set between 2 mm and 3 mm for improved charged and uncharged particle collection. Other channel widths could be applied as well.

In certain embodiments, the sampler base portion is manufactured by 3D printing or injection molding.

In a fourth aspect, there is provided herein a sampler base portion for active sampling of airborne particulates. The sampler base portion includes a longitudinal body of variable shape and size having an inner surface, the longitudinal body including a plurality of air channels with variable air channel spacing therethrough. The plurality of air channels are configured to electrostatically capture particles carried by an airstream through the channel. The longitudinal body is configured to receive one or multiple sheet(s) of ferroelectric film having no electrodes positioned on the longitudinal body such that a film surface of each sheet face each other across a fixed air gap, or, at least two sheets of polarized, ferroelectric film positioned on the longitudinal body such that their opposite polarization directions face each other across the fixed air gap to collect both charged and uncharged particles.

In certain embodiments, the longitudinal body has a lattice configuration such that the one or multiple sheet(s) of ferroelectric film or the at least two sheets of polarized, ferroelectric film are disposed thereon in a parallel orientation.

In a fifth aspect, there is provided herein a method of using a passive sampler for airborne particulate sampling. The method includes: providing a sampler base portion of variable size and shape having a longitudinal body and an inner surface such that the sampler base portion is configured with a plurality of air channels having variable air channel spacing therethrough the longitudinal body; providing a plurality of layers of ferroelectric film having a first side and a second side; polarizing the plurality of layers of ferroelectric film by applying an external electric field such that the first side produces a negative electric field at a first surface and the second side produces a positive electric field at a second surface; arranging the plurality of layers of polarized, ferroelectric film on the longitudinal body with their opposite polarization directions facing each other across a fixed air gap; setting optimal air channel spacing between each layer of polarized, ferroelectric film; drawing a plurality of incoming particles of variable sizes through the longitudinal body; collecting charged and uncharged particles on the plurality of layers of polarized, ferroelectric film housed in the longitudinal body; removing the plurality of layers of polarized, ferroelectric film from the longitudinal body; and analyzing the collected particles from the sampler.

In certain embodiments, the step of arranging the plurality of layers of polarized, ferroelectric film on the longitudinal body includes the step of wrapping the plurality of layers of polarized, ferroelectric film around the inner surface of the sampler base portion in a spiral orientation.

In certain embodiments, the step of arranging the plurality of layers of polarized, ferroelectric film on the longitudinal body includes the step of positioning the plurality of layers of polarized, ferroelectric film in a parallel orientation on the inner surface of the sampler body portion having a lattice configuration.

In certain embodiments, the plurality of layers of polarized, ferroelectric film are uniaxially oriented poly(vinylidene fluoride) (PVDF) or its copolymers with trifluoroethylene, or other polarized or non-polarized ferroelectric materials, such as ceramic and composite ferroelectric materials.

In certain embodiments, the optimal air channel spacing between each layer of polarized, ferroelectric film is set between 2 mm and 3 mm for improved charged particle collection. Other channel widths could be applied as well.

In a sixth aspect, there is provided herein a method of using an electrostatic precipitator for active sampling of airborne particulates. The method includes: providing a sampler base portion of variable size and shape having a longitudinal body and an inner surface such that the sampler base portion is configured with a plurality of air channels having variable air channel spacing therethrough the longitudinal body; providing one or multiple sheet(s) of ferroelectric film having no electrodes positioned on the longitudinal body such that a film surface of each sheet face each other across a fixed air gap, or, at least two sheets of polarized, ferroelectric film positioned on the longitudinal body such that their opposite polarization directions face each other across the fixed air gap; providing an air mover disposed outside the sampler base portion configured to pull air from an ambient environment and move air through the plurality of air channels; setting optimal air channel spacing between each sheet of ferroelectric film or polarized, ferroelectric film; drawing a plurality of incoming particles of variable sizes through the longitudinal body; collecting charged and uncharged particles on the one or multiple sheet(s) of ferroelectric film or at least two sheets of polarized, ferroelectric film housed in the longitudinal body; removing the one or multiple sheet(s) of ferroelectric film or at least two sheets of polarized, ferroelectric film from the longitudinal body; and analyzing the collected particles from the sampler.

In certain embodiments, the one or multiple sheet(s) of ferroelectric film or the at least two sheets of polarized, ferroelectric film have a parallel orientation when positioned on the inner surface of the sampler body portion having a lattice configuration.

In certain embodiments, the one or multiple sheet(s) of ferroelectric film and the at least two sheets of polarized, ferroelectric film are uniaxially oriented poly(vinylidene fluoride) (PVDF) or its copolymers with trifluoroethylene, or other ferroelectric materials, such as ceramic and composite ferroelectric materials.

In certain embodiments, the optimal air channel spacing between each sheet of ferroelectric film or polarized, ferroelectric film is set between 2 mm and 3 mm for improved charged particle collection. Other channel widths could be applied as well.

Various advantages of this disclosure will become apparent to those skilled in the art from the following detailed description, when read in light of the accompanying drawings.

BRIEF DESCRIPTION OF THE DRAWINGS

FIGS. 2A-C are perspective views of exemplary embodiments of the passive bioaerosol sampler according to the present disclosure.

DETAILED DESCRIPTION

Figure 1:
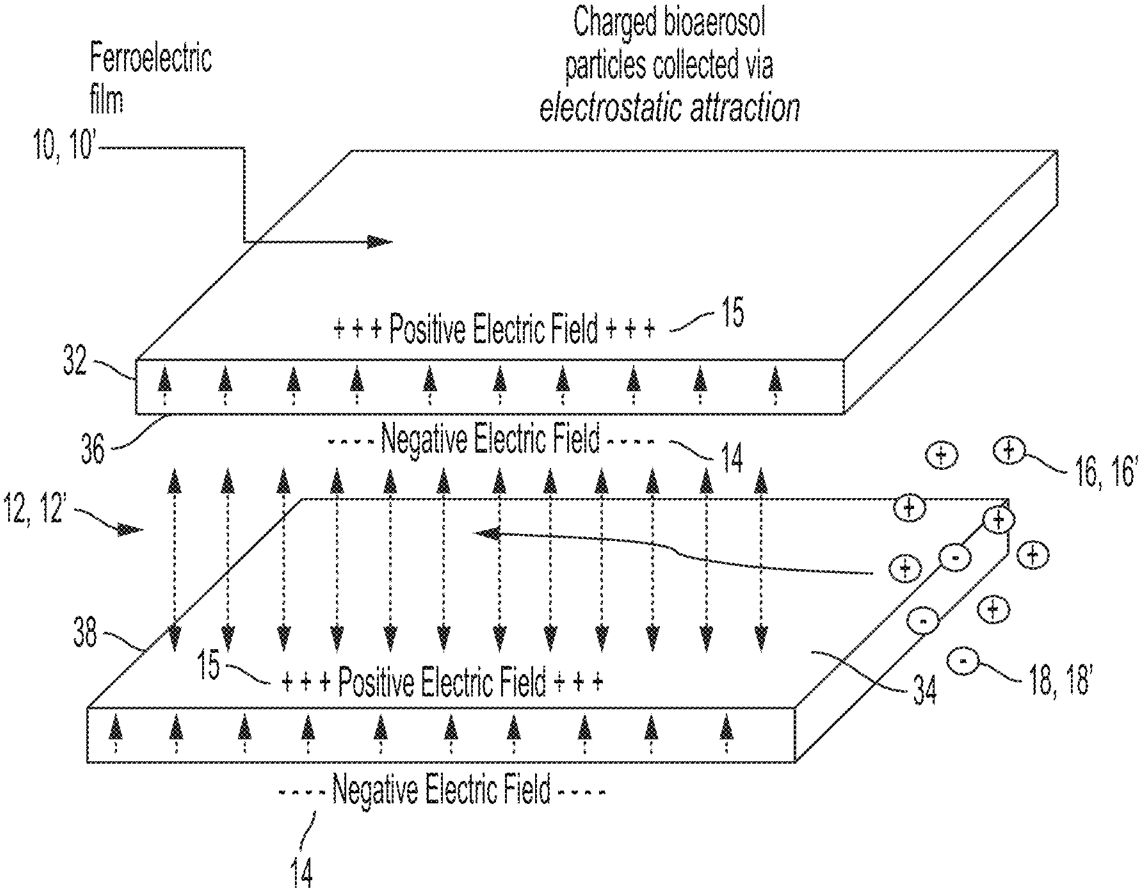
FIG. 1 is a schematic of the passive bioaerosol sampling principle according to the present disclosure.

This disclosure is not limited to the particular apparatus, systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All sizes recited in this document are by way of example only, and the disclosure is not limited to structures having the specific sizes or dimensions recited below. As used herein, the term "comprising" means "including, but not limited to."

In consideration of the figures, it is to be understood for purposes of clarity that certain details of construction and/or operation are not provided in view of such details being conventional and well within the skill of the art upon disclosure of the document described herein.

The sampler of the present disclosure is the first particulate air sampler specifically tailored for bioaerosol sampling that allows for quantitative or qualitative enumeration or identification of bioaerosols of a wide size range by passive or active sampling technology. The sampler can collect particles from the air, including bioaerosols, such as viruses, bacteria, mold spores, pollen and their agglomerates and aggregates of biological particles and other particulate matter. Typical size of such particles ranges from 20 nm to 100 micron. The sampler is specifically designed for capture of airborne particles, including airborne viruses, bacteria, mold and pollen, and does not require an air pump or external power during use. Because the passive particulate air sampler does not need an air pump, the sampler is much more cost effective, compact/portable, easier to use and allows for longer sampling times in broader locations. However, adaptation and incorporation of an air pump or air mover is possible allowing for use of the sampler technology for different bioaerosol sampling and filtration applications, including for active sampling.

Commercial production of the sampler of the present disclosure opens up possibilities to benefit both the environment and public health. The sampler can be placed anywhere indoors or outdoors, such as across agricultural fields or across cities, to monitor for spread of bacteria or molds that can kill crops or to help locate mold sources indoors or detect the presence of dangerous pathogens, including those of viral and bacterial origin. The sampler can be used as a tool to explore new areas of research, such as how global climate change may impact pollen patterns. A sampler based on the described principle can even be worn by clipping it onto a shirt collar for applications like understanding the types of particles people are exposed to in various air environments, including indoors and outdoors, residential and occupational. If a large number of people were to wear a sampler, it could be turned into a widely distributed bioaerosol monitoring network for and all environmental, homeland security, public health and science applications derived from it. The sampler could be applied for broad sampler deployment in outdoor locations, i.e., it can be turned into a monitoring network for and all environmental, homeland security, public health and science applications derived from it. Also, its low cost per device allows for easy creation of widely distributed area networks.

Examples of potential passive sampler applications include homeland security (i.e., transportation hub monitoring, such as airports, seaports and subways, attachment of samplers onto vehicles to create a mobile network, such as on city buses, and collocation of the passive and active samplers), personal bioaerosol exposure assessment (i.e., personal indoor/outdoor exposures, occupational health and safety, and study of children's allergy/asthma), citizen science projects, agricultural study and protection (i.e., sentinel information on bacterial/fungal threats to crops, integration of the passive sampler with wind vanes to maintain air flow through the sampler, and global climate change research, such as study of impacts to aeroallergen patterns), and infectious disease study and protection (i.e., studying long term trends in healthcare facilities or across cities).

The sampler of the present disclosure can be made using one or multiple sheet(s) of any polarized or non-polarized ferroelectric films or other materials. For example, polarized, ferroelectric, polymer films, such as films of uniaxially oriented poly(vinylidene fluoride) (PVDF) or its copolymers with trifluoroethylene, can be used in pairs to electrostatically attract/repel charged particles out of the air and deposit them onto the films. Particles with little or no electrostatic charge will deposit due to gravity and diffusion. A ferroelectric film (i.e., a film whose direction of electric polarization can be switched), which has been polarized by application of an external electric field, will maintain that polarization when the field is removed, until it is heated near or above its Curie temperature (Tc). Polarized PVDF has a Tc of about 167° C.; however, uniaxially oriented PVDF is a special case, as it must be drawn (oriented) before use. This limits its maximum use temperature to about 100° C. The copolymer of vinylidene fluoride and trifluoroethylene has no such limit, as it is polarizable in the undrawn state. Due to the films' polarization, one side produces a negative electric field at its surface and the other side a positive electric field at its surface. Airborne bioaerosol particles are particularly well suited to this electrostatic collection method because they carry relatively high electrical charge compared to other types of airborne particles due to the way in which they become airborne (through sneezing, coughing, HVAC air movement, wind dispersion) and their natural metabolic activity. Collection by electrostatic attraction is enhanced by particle sedimentation and diffusion. There have been other attempts to collect airborne particles by passive electrostatic means, i.e., by using electrets or electrostatic cloths, but electrostatic charge on such materials is only temporary and dissipates quickly. In contrast, polarized ferroelectric polymer films are permanently charged for all practical purposes involving environmental sampling applications (e.g., in typical environmental sampling temperatures).

Referring now to FIG. 1, a schematic of the passive bioaerosol sampling principle according to the present disclosure is illustrated. The present disclosure involves the use of multiple sheets of polarized, ferroelectric films 10 having no electrodes, placed with their opposite polarization directions facing each other across a fixed air gap 12, to collect both charged and uncharged particles 16, 18 in the surrounding environment. Charged particles are particularly attracted to the films due to the electric field 14, 15 at the films' surfaces; particles carrying low or no charge have also been shown to be effectively collected in the air gaps due to mechanical mechanisms like particle settling and diffusion. One of the films has its positive polarization side facing the other film's negative polarization side across a fixed air gap 12. The electric field 14, 15 from each film points in the same direction (perpendicular to the films' surfaces); therefore, the electric field 14, 15 in the air gap 12 between the two films' surfaces is then the sum of the field from each. Positively charged particles 16 will be attracted by the electric field of one of the films (e.g., film 1) and repelled by the electric field from the other film (e.g., film 2). Negatively charged particles 18 will be attracted by the electric field of film 2, and repelled by the electric field from film 1. The electric fields 14, 15 from both films 10 are thus responsible for the motion of any charged particle (positive or negative) 16, 18. Several pairs of polarized, ferroelectric films 10, for example, polarized PVDF films, will be housed inside an easily produced sampler enclosure (film holder) 20 (FIGS. 2A-C) to maintain the fixed gap 12 between the polarized films 10, provide for maximized exposure of sampling surface area, and to protect the samples while being collected.

In accordance with the sampler of the present disclosure, a polarized polymer film and 3D-printed sampler base (film holder) may be used to design an improved passive bioaerosol sampler. By improving the quality, accessibility, and process of passive bioaerosol sampling, the sampler provides as follows: (1) Relevant particle size collection in which the sampler can capture particles in size ranges of interest for bioaerosols, such as single and agglomerated viruses, bacteria, fungi and pollen (e.g., biological particles of interest that could be as small as nano particle range (viruses) and as large as tens of microns in diameter pollen) and even larger aggregates and agglomerates of the above or various aggregates and agglomerates of biological particles with non-biological particles; (2) An easy to manufacture film holder (film enclosure) that could be made specifically for a particular sampler application or sampling environment and (3) Streamlined sample analysis in which the sampler is designed as separate parts that can be easily transported to and from the field in 50 mL conical centrifuge tubes or similar standard or specially-made enclosures to minimize contamination and expedite removal of collected particles.

It should be understood that the 3D-printed sampler base portion may be fabricated of any suitable sufficiently sturdy material in accordance with the present disclosure.

For large scale production, the sampler base (film holder) can be made using injection molding or other suitable techniques.

The use of a polarized polymer film, such as polarized PVDF, is particularly suited for the improved sampler of the present disclosure as bioaerosol particles typically have more charge than non-biological, airborne particles (i.e., charge may be imposed by dispersion and environmental processes in addition to a natural charge that may be associated with cellular metabolic activity). Charged electrets and electrostatic dust cloths lose charge quickly (i.e., within hours to days) whereas polymer film polarization remains until the film is heated above its $T_c$ (e.g., for PVDF film this is about 167° C.); however, since PVDF films must be drawn (oriented) before use to change its crystals into its most ferroelectric crystal form, it begins to shrink at about 100° C., which limits its use temperature. However, given this is still a very high temperature compared to typical environmental conditions, this temperature dependent film shrinking is not expected to limit application of a bioaerosol sampler using these films. On the other hand, co-polymers with trifluoroethylene do not need to be oriented before polarization as they directly crystallize into the same ferroelectric crystal form as oriented PVDF and can be used up to their Curie temperature of ~150° C., depending on trifluoroethylene content.

The primary purpose for using a polarized polymer film is that fluoropolymer films like PVDF provide toughness, strength, flexibility and both chemical and UV light stability. Also, polarized PVDF polymer films provide for easy processing, in which clear, thin films with an electric field at the film's surface and a high remanent polarization are produced, which remains until the PVDF film is heated above ~100° C.

The Electric Field on each Film Surface is set forth as follows:

Electric displacement field in a material: $D=\varepsilon E+P$, where $\varepsilon$ is the permativity of the material:

In this case, $\varepsilon$=permittivity of air$\approx\varepsilon_0$=permittivity of vacuum=$8.85\times10^{-12}$ [$C^2/N\cdot m^2$].

P=polarization=90 $mC/m^2$

E=electric field

Determination of the electric field on the outside surface of PVDF film:

On the inside surface of the film, $E_{inside}=0$, therefore $D_{inside}=P$

On the outside surface of film, P=0, therefore, $D_{outside}=\varepsilon E\approx\varepsilon_0 E_{outside}$ Since D is perpendicular to the film's surface and, therefore, continuous across the film's interface with air:

$D_{inside}=D_{outside}$. Therefore, $P=\varepsilon_0 E_{outside}$ and $E_{outside}=P/\varepsilon_0$ $E_{outside}=(0.09\ C/m^2)/(8.85\times10^{-12}\ C^2/N\cdot m^2)=10^{10}$ V/m at the films' surfaces The improved passive sampler of the present disclosure addresses the significant passive bioaerosol sampling issues: (1) Conceptual design testing is shown to capture particles ranging in size from 14 to 5000 nm (larger sizes collected during outdoor field tests); (2) Chosen sampler materials provide significantly greater collection efficiency than controls for maximized sampler performance; (3) Sampler is designed for ease of set up with streamlined analysis by having separate components that fit into 50 mL conical centrifuge tubes or similar standard or specially-made enclosures; (4) Culture-dependent as well as any culture-independent liquid analysis is possible; and (5) An easy to manufacture film holder (film enclosure) that could be made specifically for a particular sampler application or sampling environment.

The passive bioaerosol sampler 22 includes a sampler base portion 20 of variable size and shape having a longitudinal body 24 and an inner surface 26. The sampler base portion 20 is configured with a plurality of air channels 28 having variable air channel spacing 30 therethrough the longitudinal body 24. As illustrated in FIG. 1, a plurality of layers of ferroelectric film 10 have a first side 32 and a second side 34 polarized by application of an external electric field such that the first side 32 produces a negative electric field 14 at a first surface 36 and the second side 34 produces a positive electric field 15 at a second surface 38. The plurality of layers of polarized, ferroelectric film 10 are disposed thereon the longitudinal body 24 with their opposite polarization directions facing each other across a fixed air gap 12 to collect both charged and uncharged particles 16, 18.

FIGS. 2A-C show perspective views of exemplary embodiments of the passive bioaerosol sampler 22 according to the present disclosure. Specifically, in FIG. 2A, ferroelectric film is wrapped around the sampler base 20 in a spiral orientation with optimal air gap spacing 12 between spiral layers. In FIG. 2B, the sampler 22 is configured with parallel layers of film with opposite sides facing each other and with optimal air gap spacing 12 between each layer. As shown in FIG. 2C, samplers 22 can be used individually or grouped together as a unit indoors and/or outdoors to monitor areas with or without elements such as rain protection or wind vanes, or they can be worn as personal samplers.

It should be understood that the passive bioaerosol sampler of the present disclosure may be configured of any suitable size and shape for use in bioaerosol sampling both indoors and outdoors. The sampler base (film holder) can be tailored to and customized for any environmental sampling application because the basis of the sampler, the ferroelectric films, have flexible size, width and air channel spacing.

Figure 3:
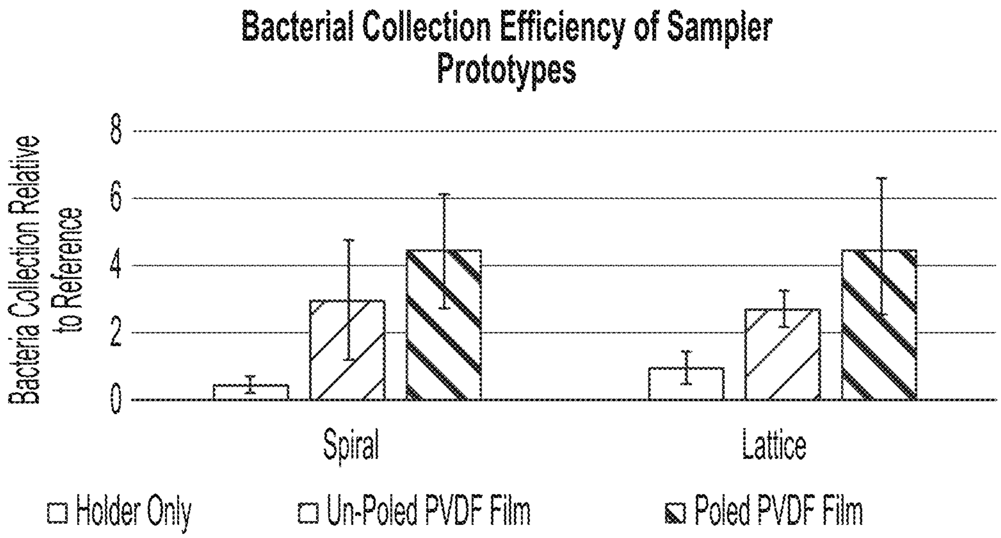
FIG. 3 is a bar graph illustrating the bacterial collection efficiency of passive sampler prototypes according to the present disclosure.

Referring now to FIG. 3 is a bar graph illustrating the bacterial collection efficiency of passive sampler prototypes according to the present disclosure. Laboratory experiments provided evidence that significantly better airborne bacteria collection efficiency was obtained when sampling with a polarized ferroelectric film with a spiral and lattice film configuration. The reference was a 25 mm filter onto which test particles passively settled.

Figure 4A:
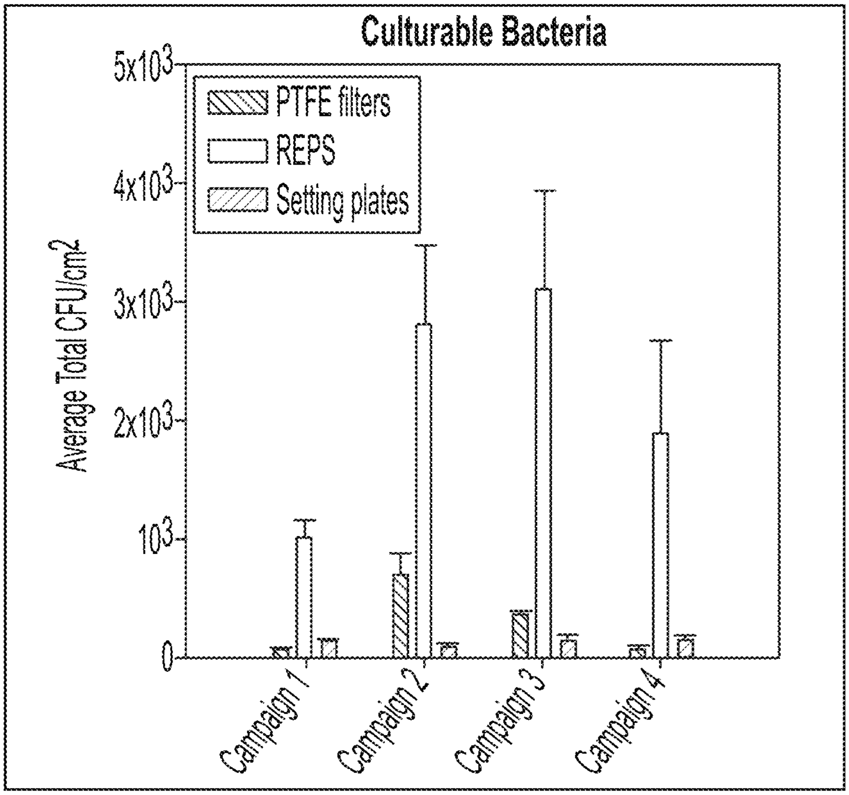
FIG. 4 is a bar graph presenting the average total number of culturable bacteria and fungi as colony forming units (CFU) counted per $cm^2$ of projected surface area for the presently disclosed passive sampler versus the Teflon filter and settling plate controls.
Figure 4B:
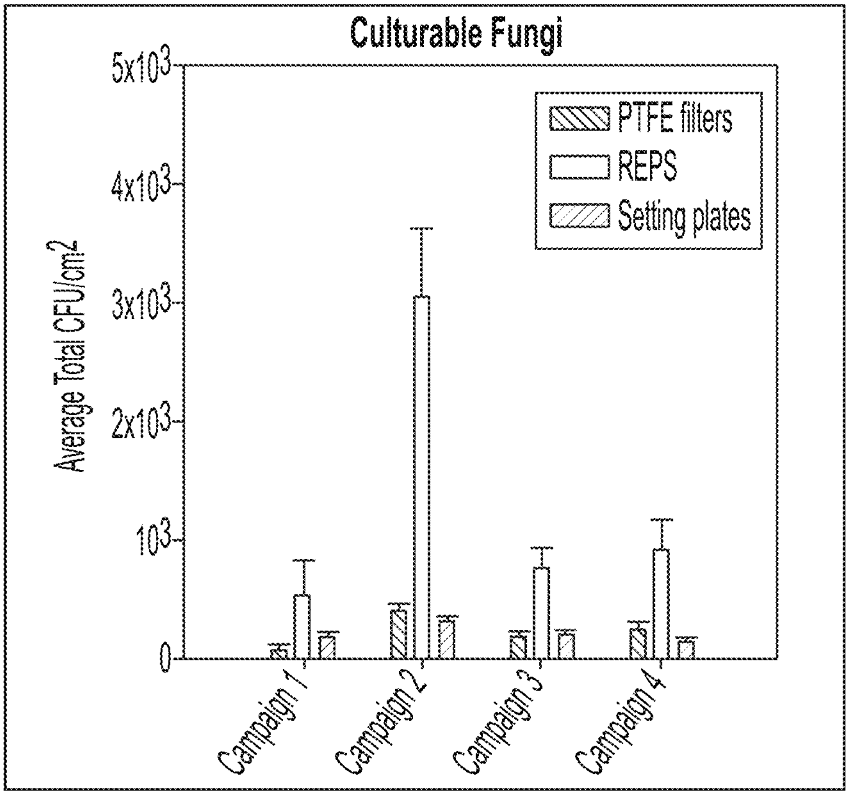

FIG. 4 is a bar graph presenting the average total number of culturable bacteria and fungi as colony forming units (CFU) counted per $cm^2$ of projected collection surface area for the presently disclosed passive sampler versus the Teflon (PTFE) filter and settling agar plate controls. In particular, the bar graph shows the average total number of CFUs normalized to sampler's surface area ($CFU/cm^2$, mean±1SD) of culturable bacteria (A) and culturable fungi (B) collected by passive samplers. Each sampling campaign was 10 days long. REPS refers to the presently disclosed passive sampler.

Figure 5:
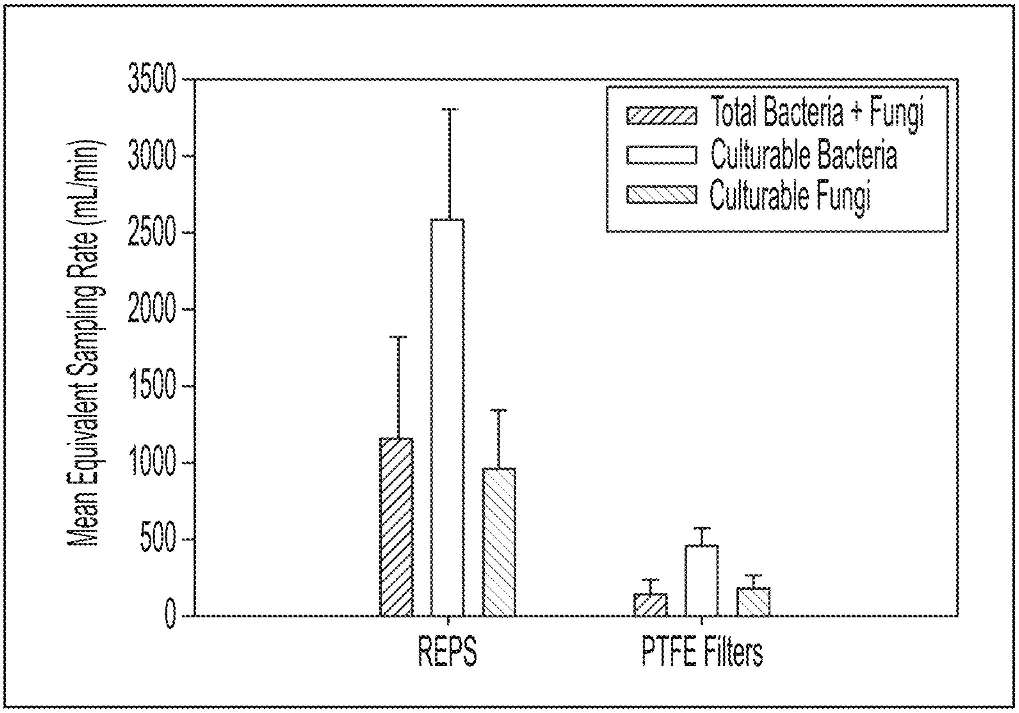
FIG. 5 is a bar graph presenting the data as calibrated equivalent flow rates for the presently disclosed passive sampler versus the reference Teflon (PTFE) filter.

FIG. 5 is a bar graph presenting the data as calibrated equivalent flow rates for the presently disclosed passive sampler versus the reference Teflon (PTFE) filter. Specifically, the bar graph shows the average equivalent sampling rates (mL/min, mean±1SD) for passive samplers compared to the Button Aerosol Sampler operated at 4 L/min. These values were obtained as the average across four 10 day long outdoor sampling campaigns. REPS refers to the presently disclosed passive sampler.

Figure 6A:
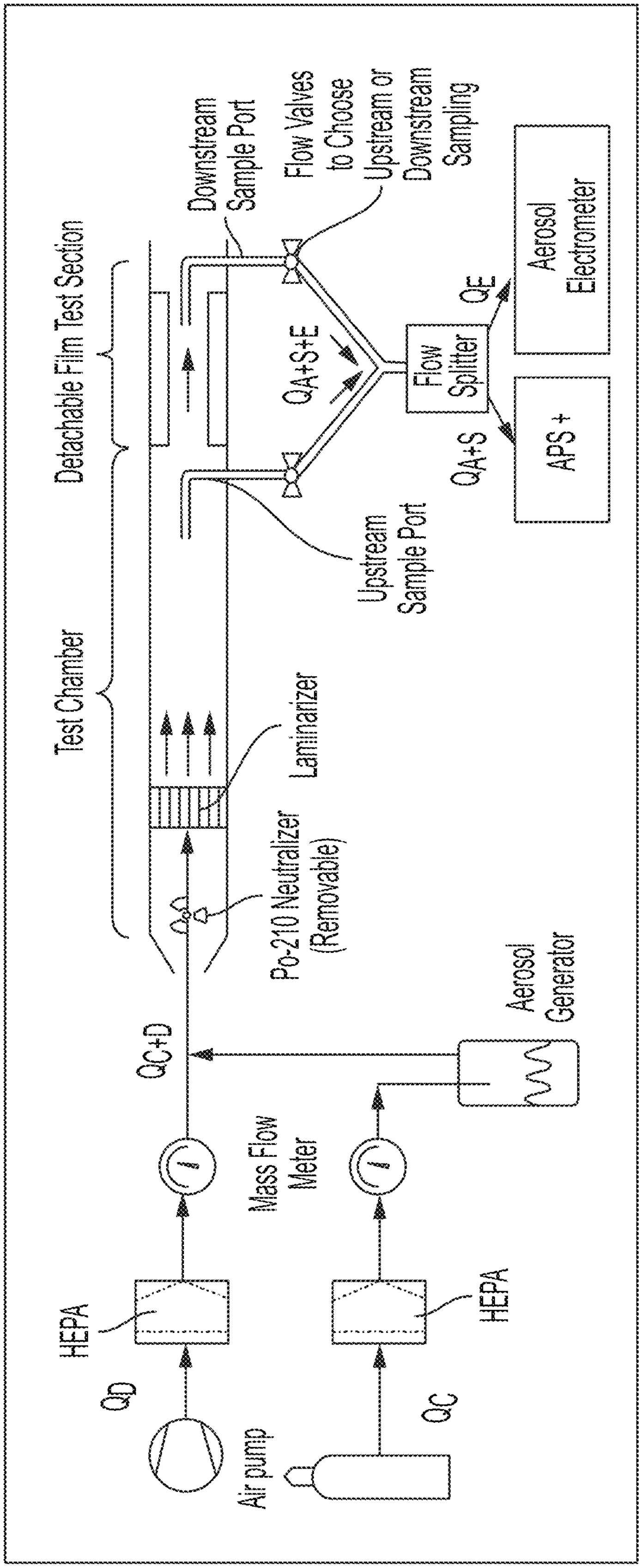
FIG. 6A is a schematic of an experimental wind tunnel setup of the active electrostatic precipitator for testing different types of film materials, according to the present disclosure.
Figure 6B:
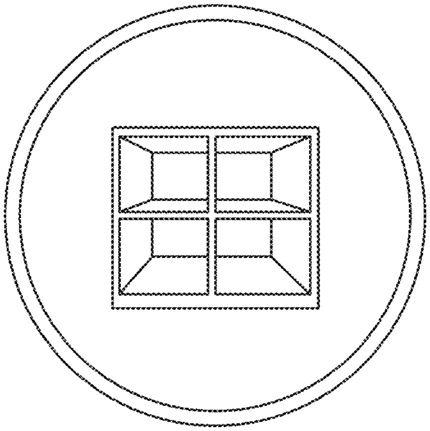
FIG. 6B is a front plan view of an exemplary detachable film test section of the wind tunnel setup of FIG. 6A, according to the present disclosure.
Figure 6C:
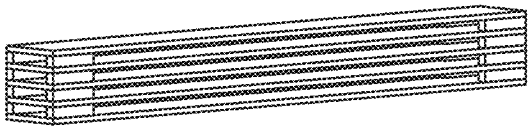
FIG. 6C is a perspective view of exemplary spacing lattices, which insert into the square chambers of the detachable film test section of FIG. 6B to set air channel spacing between sheets of tested film materials, according to the present disclosure.

FIG. 6A is a schematic of an experimental wind tunnel setup of the ESP for testing different types of film materials, according to the present disclosure. FIG. 6B is a front plan view of an exemplary detachable film test section of the wind tunnel setup of FIG. 6A, according to the present disclosure. FIG. 6C is a perspective view of exemplary spacing lattices, which insert into the square chambers of the detachable film test section of FIG. 6B to set air channel spacing between sheets of tested film materials, according to the present disclosure.

Figure 7:
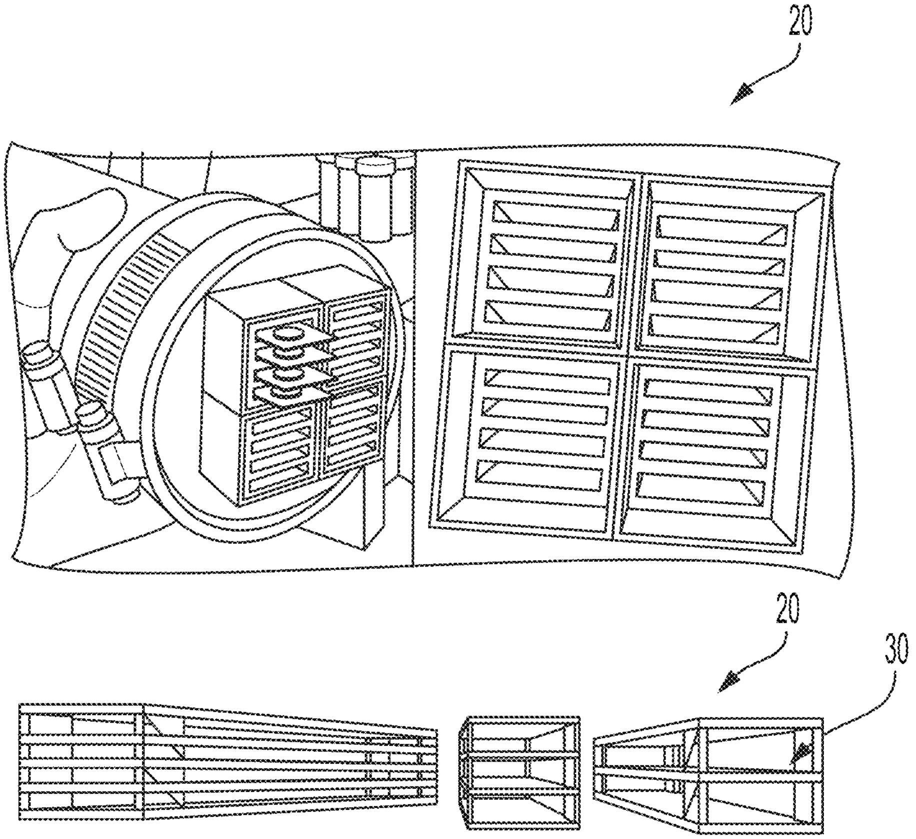
FIG. 7 shows the 3D-printed spacing lattices for candidate test materials used with the experimental set up of FIG. 6A according to the present disclosure.

FIG. 7 shows the 3D-printed spacing lattices (i.e., sampler base portions) 20 for candidate test materials used with the experimental set up of FIG. 6A according to the present disclosure.

Figure 8:
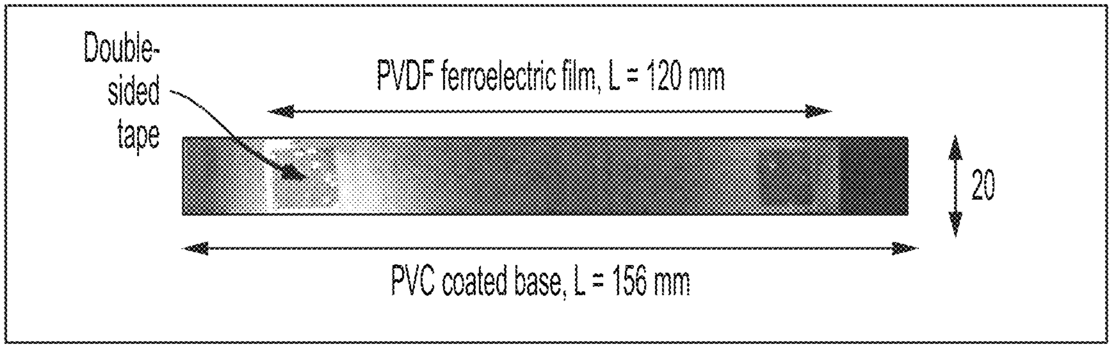
FIG. 8 is a photograph of the base with PVDF on top as an example of the polarized, ferroelectric film setup, according to the present disclosure.
Figure 9:
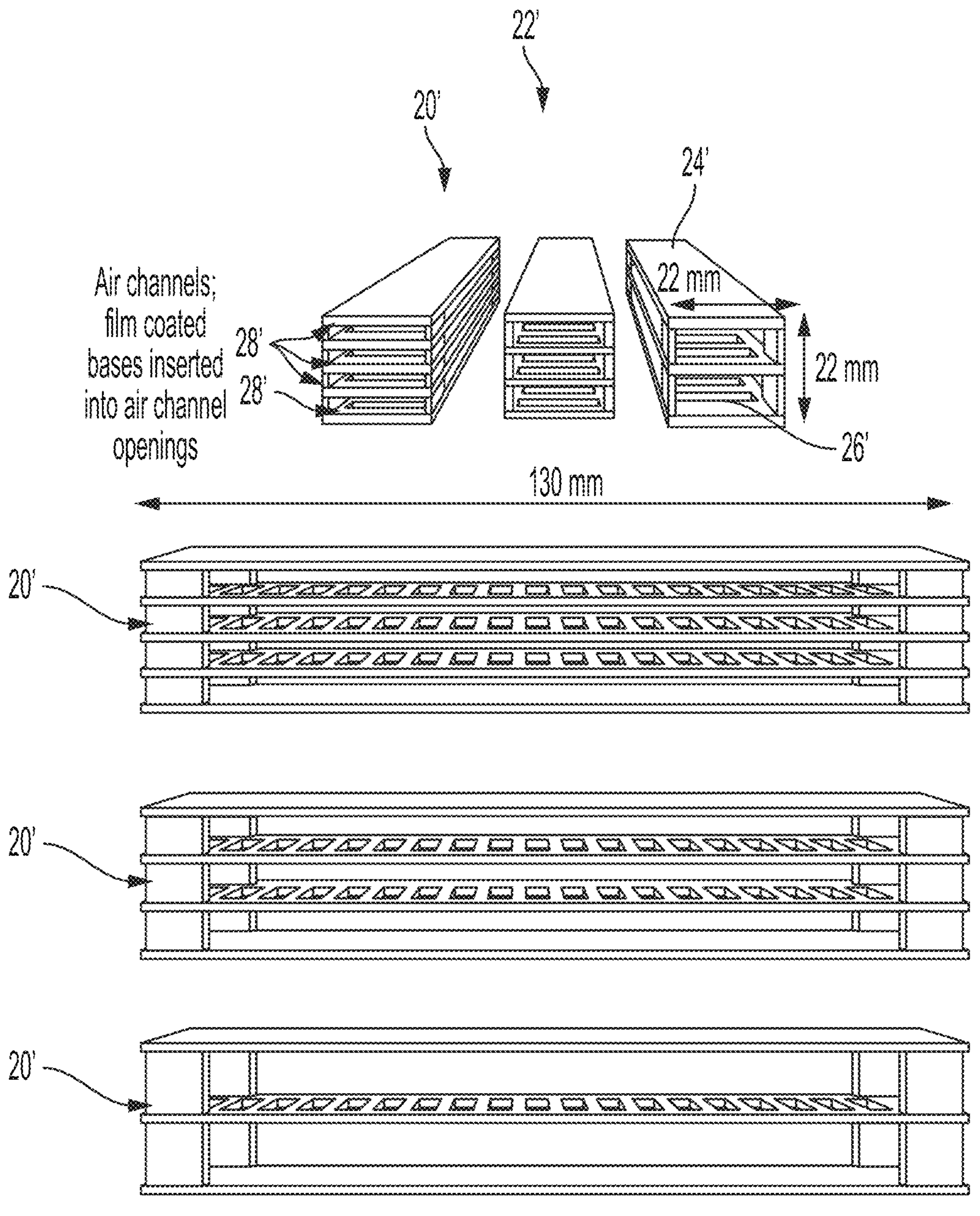
FIG. 9 shows photographs of the spacing lattices used in the experimental setup of FIG. 6A, according to the present disclosure.
Figure 10:
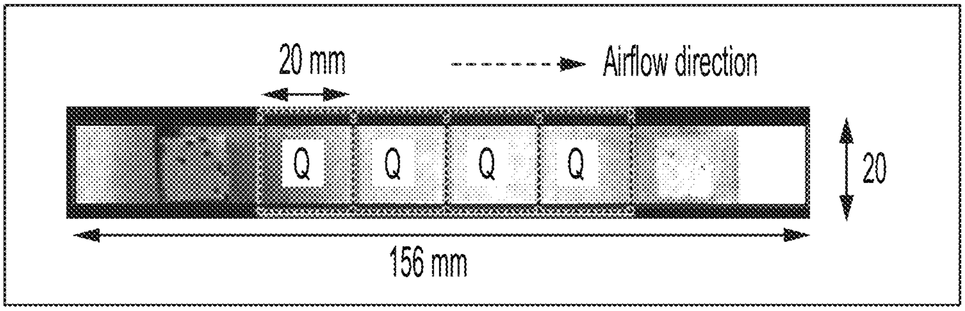
FIG. 10 is a photograph of the base with PVDF on top and with indicators showing how Q1 to Q4 were positioned for the experimental procedures described herein, according to the present disclosure.

FIG. 8 is a photograph of the base with PVDF on top as an example of the polarized, ferroelectric film setup, according to the present disclosure. FIG. 9 shows photographs of the spacing lattices used in the experimental setup of FIG. 10, according to the present disclosure. FIG. 10 is a photograph of the base with PVDF on top and with indicators showing how Q1 to Q4 were positioned for the experimental procedures described herein, according to the present disclosure.

Figure 11:
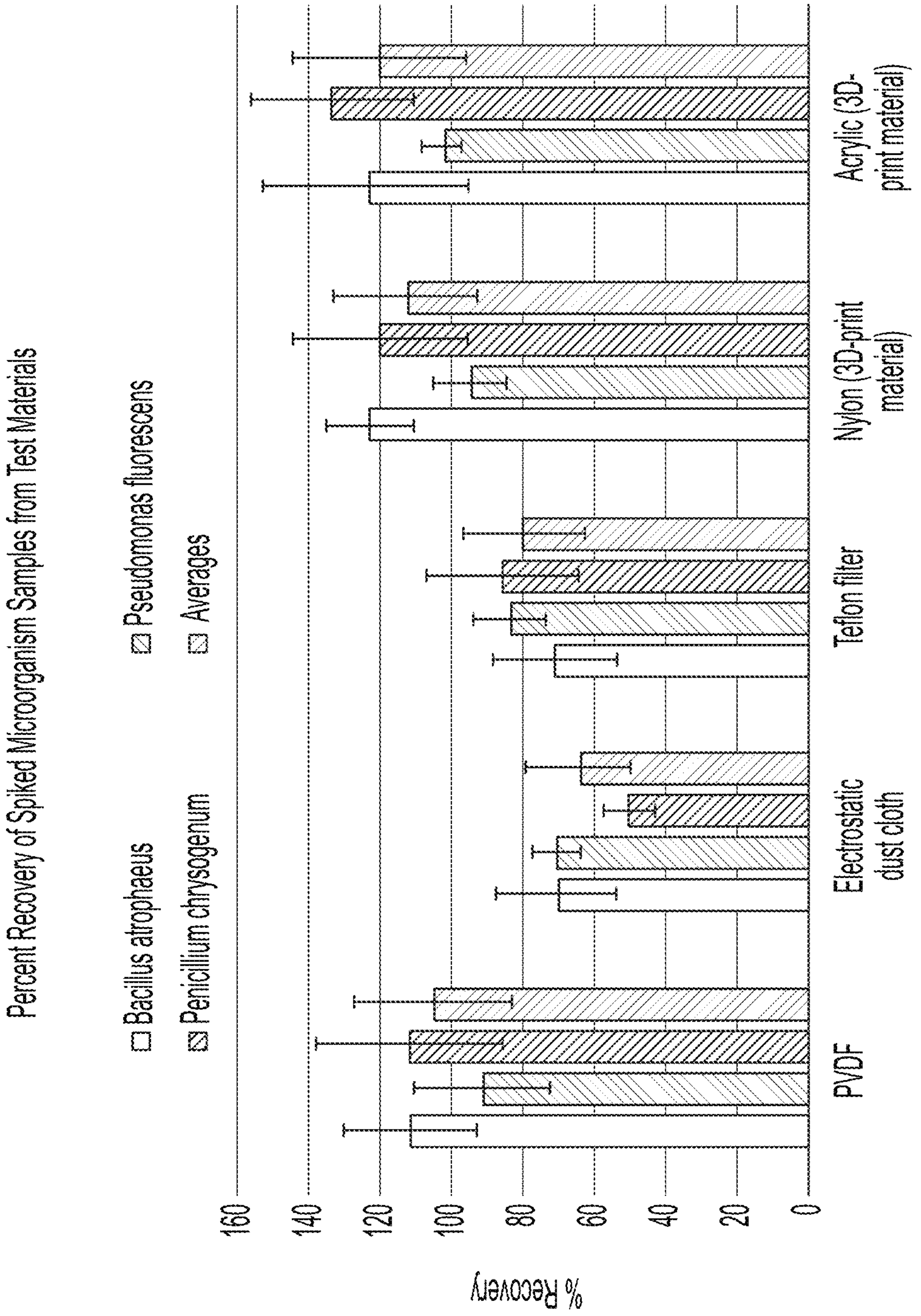
FIG. 11 is a bar graph illustrating the percent recovery of spiked bacteria samples from test materials in the determination of particle removal efficiency according to the present disclosure.

FIG. 11 is a bar graph illustrating the percent recovery of spiked microorganism samples from test materials in the determination of particle removal efficiency according to the present disclosure. Test materials were placed into 50 mL conical centrifuge tubes with 40 mL of autoclaved MilliQ water. To remove microorganisms from the test materials, the tubes were then vortex mixed for 2 minutes, and then placed into an ultrasonic bath for 10 minutes. Unlike most other procedures discussed in the scientific literature, Tween is not needed to achieve >95% extraction efficiency from PVDF. This is a significant improvement, because fewer components/supplies are needed for sample processing and the procedure becomes less complicated. In addition, by avoiding Tween, potential damage to certain microorganisms by Tween is prevented. The latter has been reported in literature.

Table 1 set forth below provides a comparison of the passive sampler of the present disclosure with other currently available passive aerosol samplers and sampler concepts.

TABLE 1

Comparison of passive sampler in the present disclosure with other passive aerosol samplers and sampler concepts.

| Sampler | Sample Type and Analysis Method | Particles Collected | Evaluation metric |
|---|---|---|---|
| Passive Bioaerosol Sampler (present disclosure) | Bioaerosol or general aerosol (any microbiological method) | >0.014 μm | Equivalent sampling rate calibrated against active, reference sampler at 4 L/min (Button Aerosol Sampler) = 1 L/min for total and culturable fungi, 2.6 L/min for culturable bacteria |

TABLE 1-continued

Comparison of passive sampler in the present disclosure with other passive aerosol samplers and sampler concepts.

| Sampler | Sample Type and Analysis Method | Particles Collected | Evaluation metric |
|---|---|---|---|
| Settling Plates | Bioaerosol (culturable) | Unknown | Yes or no for presence of microorganisms |
| Electrostatic Dust Cloth | Endotoxin (LAL assay) conducted in literature; can be used with any microbiological method | Unknown | Correlation (R2 = 0.7 compared to Button Aerosol Sampler) |
| Personal Aeroallergen Sampler (PAAS) | Allergens and pollens by gravitational settling - particles >5 μm (microscopy/ deposition modeling) | >5 μm | Equivalent sampling rate = 32 ± 6 mL/min to 66 ± 44 mL/min when sampling fungal species >5 μm in aerodynamic diameter |
| Wagner-Leith Sampler | Only tested for general aerosol (microscopy/ deposition modeling) | PM10 Or PM2.5 | Correlation (R2 = 0.7 compared to 8-stage impactor) |
| Einstein Lioy Deposition Sampler | Only tested for general aerosol (microscopy/ deposition modeling) | >1 μm | Trend comparison (Chi Square goodness of fit: p = 1) |
| Electret | Only tested for general aerosol (mass concentration relative to active sampler) | PM10 | Equivalent sampling rate = 22.5 mL/min when testing its performance in the laboratory to collect asbestos fibers |
| Sticky foils | Only tested for general aerosol (light extinction on foils) | >100 μm | Correlation (R2 = 0.8 compared to Aerodynamic Particle Sizer (APS, TSI Inc.)) |

The present disclosure further contemplates a method of using a passive sampler for airborne particulate sampling. The method includes: providing a sampler base portion of variable size and shape having a longitudinal body and an inner surface such that the sampler base portion is configured with a plurality of air channels having variable air channel spacing therethrough the longitudinal body; providing a plurality of layers of ferroelectric film having a first side and a second side; polarizing the plurality of layers of ferroelectric film by applying an external electric field such that the first side produces a negative electric field at a first surface and the second side produces a positive electric field at a second surface; arranging the plurality of layers of polarized, ferroelectric film on the longitudinal body with their opposite polarization directions facing each other across a fixed air gap; setting optimal air channel spacing between each layer of polarized, ferroelectric film; drawing a plurality of incoming particles of variable sizes through the longitudinal body; collecting charged and uncharged particles on the plurality of layers of polarized, ferroelectric film housed in the longitudinal body; removing the plurality of layers of polarized, ferroelectric film from the longitudinal body; and analyzing the collected particles from the sampler.

In some embodiments, the step of arranging the plurality of layers of polarized, ferroelectric film on the longitudinal body includes the step of wrapping the plurality of layers of polarized, ferroelectric film around the inner surface of the sampler base portion in a spiral orientation.

In other embodiments, the step of arranging the plurality of layers of polarized, ferroelectric film on the longitudinal body includes the step of positioning the plurality of layers of polarized, ferroelectric film in a parallel orientation on the inner surface of the sampler body portion having a lattice configuration.

In some embodiments, the plurality of layers of polarized, ferroelectric film are uniaxially oriented poly(vinylidene fluoride) (PVDF) or its copolymers with trifluoroethylene, or other polarized or non-polarized ferroelectric materials, such as ceramic and composite ferroelectric materials.

In further embodiments, the optimal air channel spacing between each layer of polarized, ferroelectric film is set between 2 mm and 3 mm for improved charged particle collection. It should be understood that other channel widths could be applied as well.

In another exemplary embodiment, the sampler of the present disclosure involves the application of any ferroelectric materials to create a self-powered ESP that can be used for active sampling of airborne particulate matter (see the detachable film section of FIGS. 6A-C). The films are flexible and can be oriented as multiple parallel film sheets with air channels in between the paired sheets. The total sizing of the film sheets, number of paired sheets, air channel spacing, and film orientation is customizable for different airborne particulate matter sampling applications. The film and air channel orientation allow for collection of airborne particulates as they are carried through the air channels by moving air, which is enabled by an air mover (i.e., fan, pump, etc.) (see FIG. 6A and FIG. 9). The air mover pulls or pushes air from the ambient environment and moves it through the air channels thus providing a defined amount (volume) of air entering the sampler. The film and air channel orientation establish a permanent, stable electric field between the films and those particulates that have sufficient electrical charge are attracted to and deposited onto the film surface of opposite polarity to the charge on the particle. In this embodiment, the configuration described can be used as an electrostatic precipitation filter in HVAC applications. A charge may be imparted to the particles before electrostatic collection.

The electrostatic precipitator 22' for active sampling includes a sampler base portion 20' of variable size and shape having a longitudinal body 24' and an inner surface 26' (see FIG. 9). The sampler base portion 20' is configured with a plurality of air channels 28' having variable air channel spacing 30' therethrough the longitudinal body 24'. At least one sheet of ferroelectric film 10' having no electrodes is positioned on the longitudinal body such that a film surface of each sheet face each other across a fixed air gap, or, at least two sheets of polarized, ferroelectric film 10' are positioned on the longitudinal body 24' such that their opposite polarization directions face each other across the fixed air gap 12' to collect both charged and uncharged particles 16', 18' (see FIG. 1). An air mover (see FIG. 6A) disposed outside the sampler base portion 20' is configured to pull or push air from the ambient environment and move air through the plurality of air channels 28' during collection of the charged and uncharged particles 16', 18'.

This collection mechanism is particularly well suited to biological particles (i.e., airborne particles of biological origin, such as viruses, bacteria, fungi, pollen, and their agglomerates and aggregates of biological particles and other particulate matter) due to the nature of airborne biological particles tending to have higher surface electrical charge than other types of airborne particulate matter. It has been shown that the natural surface charge carried by bioaerosol particles can be used to capture these particles from air without applying additional charge. Thus, this particular device is particularly well suited, but not limited to, the collection of bioaerosol particles. Typical size of such particles ranges from 20 nm to 100 micron.

Since the volume of air entering the sampler is known, the number of collected particles can be used to determine airborne particle concentration, such as number of particles per cubic meter of air.

Numerous advantages and uniqueness of the sampler include as follows: unlike in traditional ESPs, there is no need to power particle charging or collection zones; therefore, this ESP has the lowest power requirements and the gentlest sampling method compared to other ESP devices. In addition to particle attraction and repulsion onto film surfaces by electrostatics, particle collection is enhanced by air microcurrents and gravitational settling. Other customizable sampler components include a flow laminarizer, particle pre-selectors (to remove size fractions that are of no interest in a particular application), and different film surface adaptations, such as different surface textures to enhance particle collection or coatings to ease particle removal.

Commercial production of the sampler can include a variety of different types of customized ESPs with different sizes, film types, air channel spacing, pre-selective inlets, sampler components and/or film surface modifications. The thin films are flexible and air channel size and sampler orientation can be adjusted depending on desired flow rate or targeted particle types. Some, but definitely not all, example applications include sampling in regulated environments like Good Manufacturing Practice environments in the pharmaceutical industry, air sampling for mold in flood damaged buildings, or sampling for academic/government research purposes. ESPs can also be customized for different types of air cleaning purposes, such as in environments where there is unwanted microbial load, as in healthcare facilities. This ESP configuration can also be used in HVAC bioaerosol filtration applications and, if the particles are precharged, in general HVAC particle filtration. As there is very low power requirement since power is only needed for an air mover, this ESP is more portable making it easier to carry and maneuver, or wear for the purposes of personal sampling, e.g., for exposure assessment. Examples for the usefulness of these applications include field sampling with multiple desired checkpoints over a wide area, such as for investigating the sources of Legionella across a cityscape, or for personal exposure monitoring in occupational environments.

The sampler of the present disclosure has the distinct advantages of typical ESPs (i.e., collection for nanosized particles which includes all viruses and low pressure drop) with none of the drawbacks of typical ESPs, such as microbial inactivation. In addition, the sampler offers the benefits of very low power consumption and, for bioaerosol sampling applications, the particles in the incoming airstream do not need to be charged. Therefore, it does not produce ozone since there is no particle charging step. This is significant as there have been some attempts to use ESP technology on a large scale to remove microorganisms from the air in places like agricultural animal houses, but there was too much ozone produced which is also a dangerous respiratory irritant that can damage the lungs/airways of livestock and humans alike. The ability to operate without producing ozone makes this sampler ideally suited for personal exposure assessment, where samplers have to be worn in a personal breathing zone for long periods of time.

It should be understood that the ESPs of the present disclosure are directly applicable to air filtration, specifically, applications in HVAC air filtration as a bioaerosol filter or with particle charging, as a general HVAC particulate filter, including bioaerosol particles.

The sampler of the present disclosure can be made using surfaces from any ferroelectric materials. For example, polarized, ferroelectric, polymer films, such as films of uniaxially oriented poly(vinylidene fluoride) (PVDF) or its copolymers with trifluoroethylene can be used in pairs or rows to electrostatically attract/repel charged particles out of the air and onto the films' surfaces. Particles with little or no electrostatic charge can still be captured due to air microcurrents and gravitational settling. A ferroelectric film (i.e., a film whose direction of electric polarization can be switched), which has been polarized by application of an external electric field, will maintain that polarization after the field is removed. Due to the film's polarization, one side produces a negative electric field at its surface and the other side a positive electric field at its surface. Electrets have been previously applied in a similar manner to aerosol sampling with materials like polypropylene discs with injected surface charge. However, direct application of electret-type materials for bioaerosol collection is problematic because the injected charge on the electret material will be lost over time resulting in decreased particle collection efficiency. Polarized, ferroelectric materials, on the other hand, will maintain their polarization after the applied electric field is removed, until heated up to or above their Curie temperature.

The present active ESP type sampler is based on similar collection mechanisms as the previously disclosed passive particulate sampler in U.S. Provisional Application No. 62/222,857 described above, but the optimized sampler designs, applications, and product markets are completely different. Passive sampling (no use of any air movers) and active sampling (sampling done with air movers) are complementary activities that fulfill very different environmental needs and market niches. Passive sampling is meant for long term trend analysis over large spatial scales and where power is not accessible, or is undesirable to use (i.e., combustive environments); active sampling is meant for fast sample turnaround time in applications with few restrictions on power consumption where accurate measurement of sampled air volume is needed. Accordingly, the active sampler disclosed herein is distinguished from the passive sampler as its final design will have to incorporate not just addition of an air mover, but optimized configuration to accommodate an intended flow rate, flow laminarizers to ensure laminar air flow, and potentially, particle removers and film surface modifications. If desired, a particle charging section could be incorporated to further increase particle collection efficiency, especially if sampling non-biological particles. Further design and customization will be needed for necessary analysis methods and components.

Relative to other types of available ESPs, this is the first ESP that does not require a particle charging ionizer and therefore does not need power for charging and collection zones. This sampler uses single or multiple sheets of ferroelectric films having no electrodes, placed with their film surfaces facing each other across a fixed air gap, to collect both charged and uncharged particles in the surrounding environment. If using poled films, the opposite polarization directions will face each other; using this setup, one of the films has its positive polarization side facing the other film's negative polarization side across a fixed air gap. Thus, the electric fields from both films' surfaces point in the same direction and the total field in the gap is equal to the scalar sum of the magnitudes of the fields from each film. As there is no ionizer needed, this ESP has very low power requirements. In addition, unlike traditional ESPs, it does not need a particle corona charging section for bioaerosol collection and under these conditions it does not produce ozone. It is the most customizable in terms of total size and shape.

In accordance with the sampler of the present disclosure, a ferroelectric fluoropolymer film and 3D-printed sampler base (film holder) is used to design an improved active bioaerosol sampler. By improving the quality, accessibility, and process of active bioaerosol sampling, the sampler provides as follows: (1) Relevant particle size collection in which the sampler can capture particles in size ranges of interest for viruses, bacteria, fungi, and pollen (e.g., particle diameter ≥0.01 μm); (2) An easy to manufacture film holder (film enclosure) that could be made specifically for a particular sampler application or sampling environment; and (3) Streamlined sample analysis in which the sampler is designed as separate parts that can be easily transported to and from the field in 50 mL conical centrifuge tubes or similar standard or specially-made enclosures to minimize contamination and expedite removal of collected particles.

It should be understood that the 3D-printed sampler base may be fabricated of any suitable sufficiently sturdy material in accordance with the present disclosure.

For large scale production, the sampler base (film holder) can be made using injection molding or other suitable techniques.

It should be understood that the active bioaerosol sampler of the present disclosure may be configured of any suitable size and shape for use in bioaerosol sampling both indoors and outdoors. The sampler base can be tailored to and customized for any environmental sampling application because the basis of the sampler, the ferroelectric films or other ferroelectric materials, have flexible size, width and air channel spacing.

In further accordance with the electrostatic precipitator 22' of the present disclosure, a sampler base (film holder) 20' as previously described above includes the arrangement of one or more sheets of ferroelectric polymer film 10', or any other ferroelectric materials with high enough polarization so that at least one air channel 28' is formed by the ferroelectric materials. The at least one formed air channel 28' is configured to electrostatically capture both charged and uncharged particles carried by an airstream through the channel.

The present disclosure further contemplates a method of using an electrostatic precipitator for active bioaerosol sampling of airborne particulates. The method includes: providing a sampler base portion of variable size and shape having a longitudinal body and an inner surface such that the sampler base portion is configured with a plurality of air channels having variable air channel spacing therethrough the longitudinal body; providing one or multiple sheet(s) of ferroelectric film having no electrodes positioned on the longitudinal body such that a film surface of each sheet face each other across a fixed air gap, or, at least two sheets of polarized, ferroelectric film positioned on the longitudinal body such that their opposite polarization directions face each other across the fixed air gap; providing an air mover disposed outside the sampler base portion configured to pull air from an ambient environment and move air through the plurality of air channels; setting optimal air channel spacing between each sheet of ferroelectric film or polarized, ferroelectric film; drawing a plurality of incoming particles of variable sizes through the longitudinal body; collecting charged and uncharged particles on the at least one sheet of ferroelectric film or at least two sheets of polarized, ferroelectric film housed in the longitudinal body; removing the one or multiple sheet(s) of ferroelectric film or at least two sheets of polarized, ferroelectric film from the longitudinal body; and analyzing the collected particles from the sampler.

In some embodiments, the one or multiple sheet(s) of ferroelectric film or the at least two sheets of polarized, ferroelectric film have a parallel orientation when positioned on the inner surface of the sampler body portion having a lattice configuration.

In other embodiments, the one or the multiple sheet(s) of ferroelectric film and the at least two sheets of polarized, ferroelectric film are uniaxially oriented poly(vinylidene fluoride) (PVDF) or its copolymers with trifluoroethylene, or other polarized or non-polarized ferroelectric materials, such as ceramic and composite ferroelectric materials.

In further embodiments, the optimal air channel spacing between each sheet of ferroelectric film or polarized, ferroelectric film is set between 2 mm and 3 mm for improved charged particle collection. It should be understood that other channel widths could be applied as well.

Figure 16:
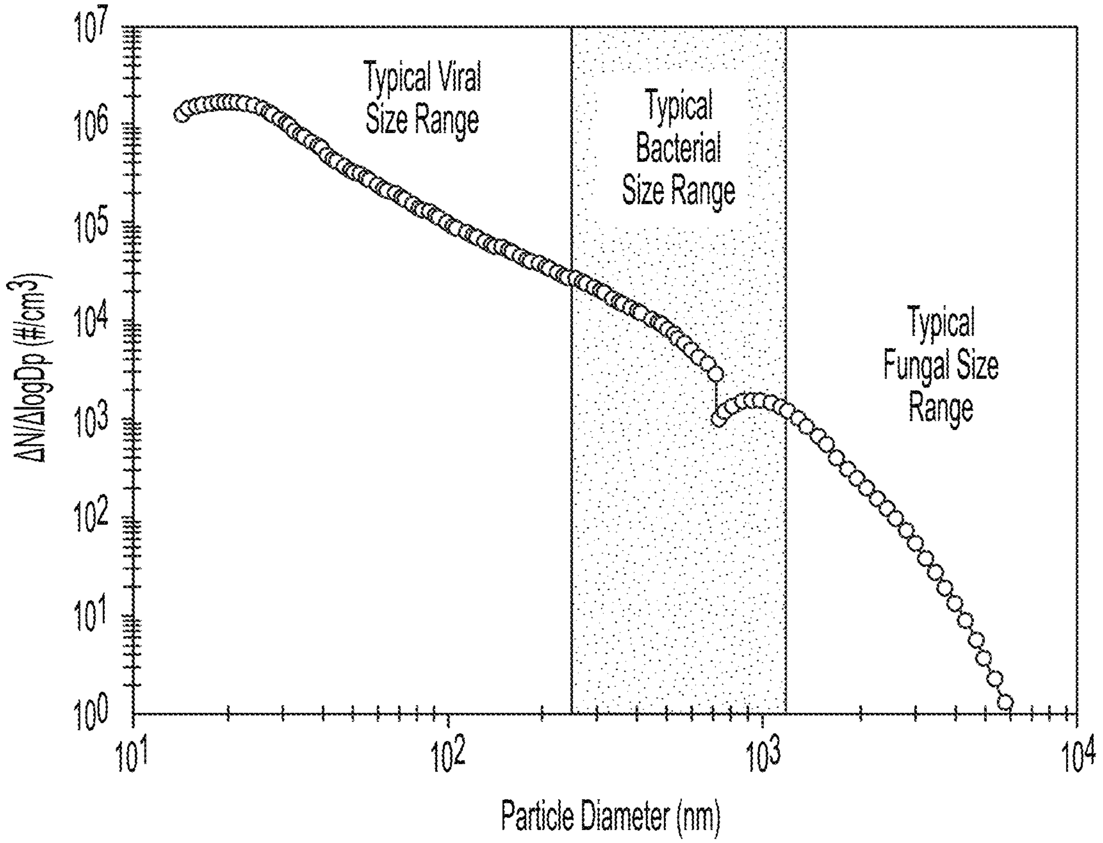
FIG. 16 is a graph illustrating the particle number size distribution for ARD Slurry (25 mL) produced from 3-Jet Collison Nebulizer at 5 L/min, 20 psig that was used to obtain preliminary performance data of the ESP described herein.

Referring now to FIG. 6A is an illustration of an exemplary experimental setup that was used to test the particle collection efficiencies of the ferroelectric films and controls for the initial developmental stages of the active bioaerosol sampler. This wind tunnel setup was used because the materials' particle collection efficiencies can be examined at airstream velocities simulating typical indoor and outdoor air velocities, including indoor occupational settings. Also, the setup allows for investigation of collection efficiencies of multiple particle sizes simultaneously. A 25 mL slurry of A2 fine grade Arizona Road Dust (ARD; Powder Technology Inc., Arden Hills, Minn.) suspended in Milli-Q water (8×10-3 g/mL; EMD Millipore Corporation, Milli-Q Direct 8, Billerica, Mass.) was aerosolized using 3-Jet Collison Nebulizer (QC=5 L/min, 20 psig; Mesa Labs, Inc., Lakewood, Colo.). The slurry was prepared by suspending 0.4 g of ARD in 50 mL Milli-Q water, hand shaking the mixture for 30 seconds, then sonicating it in an ultrasonic bath (Branson 8800 ultrasonic cleaner, Branson Ultrasonics, Danbury, Conn.) for 10 minutes. This preparation procedure ensured the slurry was sufficiently dissolved/mixed. As a result, the particle number size distribution produced by nebulization was repeatable across tests, including after prolonged use of the same suspension as well as whenever fresh suspension needed to be made (FIG. 16). Fresh slurry suspension (25 mL) was replaced in the nebulizer for each new film material tested, for different test runs using the same material and at least every 45 minutes. ARD was chosen to produce test particles because the resulting aerosol ranged in size from 0.014 μm to 6 μm covering the typical sizes of viruses, bacteria and fungi. The typical bacterial aerodynamic diameter size range is from 1-3 μm in clean indoor environments and 0.5 to 10 μm in more contaminated environments. Fungal spores tend to have aerodynamic diameters of 2-10 μm with smaller fragments of fungal material, such as glucans and mycotoxins, being smaller than 1 μm. Viruses are the smallest microorganism with physical sizes of about 20-300 nm. For further details on the ARD's airborne particle number size distribution, see FIG. 16.

The aerosolized ARD particles were then carried through the wind tunnel test chamber by dry, filtered dilution air (QD=30 L/min). The particles passed through a removable charge neutralizing section that either had an aluminum tube containing four 25.4×76.2 mm 500 μCi Po-210 ionizing units (2 mCi total; Amstat Industries, Glenview, Ill.) or an empty aluminum tube of the same dimensions. After passing the neutralizer, test particles were pushed into a test section where they were subject to collection by different ferroelectric materials and controls.

The removable material test section shown in FIG. 6B and FIG. 7 consisted of four square metal tubes (each 484 $mm^2$) fused together using a two part epoxy cold weld system (J-B KwikWeld, J-B Weld Co., Sulphur Springs, Tex.). These metal tubes were attached to a coupling for detaching/attaching the material test section from the rest of the sampling chamber using a rubber gasket. The entire test section was air tight, so that the QC+D air flow with test particles would pass through the four metal tubes. Each tube contained a 3D-printed lattice spacer made of nylon 11 (FIG. 6C, FIG. 7 and FIG. 9) holding parallel sheets of test material. The use of exchangeable lattices allowed testing different materials and different distances between sheets of the same material.

A photograph of the lattices is shown in FIG. 8. The black matte material covering the metal base is the PVC tape. PVDF was affixed to both sides of the base.

Ferroelectric Films and Control Materials

TABLE 2

Ferroelectric Films and Control Materials

| Ferroelectric Film Materials and Controls | Details | Material Thickness (μm) | Material Classification |
|---|---|---|---|
| Poly(vinylidene fluoride) (PVDF) | Polarized, uncoated poly(vinylidene fluoride) homopolymer; uniaxially oriented (Kureha America LLC, New York, NY) | 28 | Ferroelectric polymer |
| PVD(TrFE) (copolymer) | Polarized, uncoated copolymer film; 77% PVDF, 23% trifluorethylene (Piezotech Arkema, Pierre-Benite Cedex, France) | 20 | Ferroelectric polymer |
| Metal | Stainless steel, non-warping (Model 10414, Westcott, Fairfield, CT) | 500 | Conductor |
| Poly(vinyl chloride) tape (PVC) | Vinyl electrical tape (Model 30002653, Commercial Electric Inc., Wasilla, AK) | 356 | Insulator |
| Perfluoroalkoxy alkane (PFA) | High temperature, high strength perfluoroalkoxy alkane; marketed under Teflon brand (Model 84955K22, McMaster-Carr, Princeton, NJ) | 127 | Insulator |

Table 2 describes the tested polarized ferroelectric films and control materials. The two polarized polymer film types included PVDF $(CH_2CF_2)_n$— and a PVDF copolymer with trifluoroethylene (77% PVDF, 23% trifluorethylene). These polymer films are ferroelectrics—films in which the direction of permanent electric polarization can be switched. During manufacturing, these films were polarized by application of an external electric field. Once polarized, one side of the films has a negative electric field at the surface and the other side a positive electric field at the surface until/unless the film is heated above its Curie temperature.

Uniaxially oriented PVDF is a highly crystalline polymer with strong ferroelectric properties. Because it is uniaxially oriented, it will not begin to lose its polarization until it is heated above 100° C. This means that the film is permanently polarized for typical environmental sampling purposes. The copolymer also exhibits strong ferroelectric properties, but it does not need to be oriented before poling as it directly crystallizes into its most ferroelectric crystal form. The copolymer Curie temperature is ~150° C., depending on trifluoroethylene content.

The stainless steel was included as a control to obtain a baseline of test particle deposition (loss) in the lattices compared to the tested films. The other control materials included two types of non-ferroelectric polymer films, PVC and PFA. PVC was chosen because it could be obtained in a tape form and be easily used to insulate the stainless steel metal to make it a sturdy, non-warping base to which all other test materials would be applied. This allowed the test materials to lie flat during testing in the spacing lattices without being in direct contact with the metal. Consequently, this PVC-coated metal will be termed as the base (metal+PVC). For photographs of this base and spacing lattices, see FIGS. 8 and 9.

PFA was chosen as another control because, like PVDF and the copolymers, it is also a polar, fluorocarbon-based polymer and could be obtained in similar thickness.

Preparation of Test Materials

All of the tested film materials and controls were prepared in the same way prior to testing. Gloves were worn throughout all experiments to prevent contamination of the film surfaces with skin oils. The film materials were cut to size with sharp, clean scissors (20×120 mm), wiped with 70% ethanol to remove surface contaminants, and dipped into autoclaved Milli-Q water to remove ethanol residue. The base (metal+PVC) was cleaned with the same procedure after wrapping the metal with the PVC and the total PVC surface area was slightly larger than the other film types but the same as the metal's surface area (20×155 mm) (FIG. 8). All materials were allowed to dry overnight on a drying rack in a laminar flow hood (NuAire Biological Safety Cabinet, class II, type A2, Plymouth, Minn.), and then assembled in the hood to minimize potential surface contamination. The flat pieces of test materials (films) were affixed with small pieces of double-sided tape to both sides of the base (metal+PVC) using less than 200 $mm^2$ of double-sided tape per piece of film. The bases with films were inserted into the lattices and formed horizontally oriented rows of films with fixed air channel widths between the rows. Depending on the experiment, lattices with two, three or four channels were used (FIG. 9). For the polarized ferroelectric films, the films were set up to have the positive polarization sides of the film facing the negative polarization sides of the film across the air channels. For consistency, the positive polarization sides of the films were positioned to face upward except where noted below. Thus, during the experiments, air with test particles passed through the electric field present inside the channels formed by the test materials.

Film and Control Collection Efficiency Tests

As a conservative approach to investigate the practicality of using polarized, ferroelectric polymer films in a field deployable active bioaerosol sampler, the ARD aerosol was charge neutralized because most ambient aerosol particles eventually exhibit Boltzmann equilibrium charge distribution. The air velocity at entry into each metal tube of the film test section simulated typical indoor air conditions, including occupational environments.

The collection efficiency of each test material when using different lattices was determined by measuring ARD particle size distributions by number upstream of the test section and downstream of each metal tube using an isokinetic port and copper probe, respectively. The combination of Scanning Mobility Particle Sizer Spectrometer (SMPS; model 3080 with Differential Mobility Analyzer 3081; TSI Inc., Shoreview, Minn.) and Aerodynamic Particle Sizer Spectrometer (APS; model 3321; TSI Inc.) measured particle size distribution. The net aerosol charge was determined by an Aerosol Electrometer (Model 3068B; TSI Inc.). The viral, bacterial and fungal particle size ranges for these experiments were designated based on the size bins of the SMPS and APS and typical sizes of these bioaerosols: 0.01 to 0.25 μm for virus-size, 0.26 to 1.29 μm for bacteria-size, and 1.38 to 5.05 μm for fungi-size particles. Based on the air velocity and probe diameter, the isoaxial upstream inlet efficiency for sampling all size ranges of ARD was ~1.00.

As indicated in Table 2, the test materials had different thicknesses and this affected the air channel width and, consequently, air velocity through the air channels. This was corrected for each setup by calculating the resultant air exit velocities and the isoaxial inlet efficiency for a horizontal sharp-edged inlet (aspiration+transmission efficiency) using equation 10-7 from Hinds (1982). A fixed 2.25±0.20 mm air channel width was used to test film materials. Since anisokinetic sampling leads to under or overestimation of the number of large particles in a sample, downstream isoaxial inlet efficiency was determined for the midpoint diameter for each particle size range: 0.13 μm, 0.75 μm, and 3.22 μm for viral, bacterial and fungal-sized particles, respectively. The calculated inlet efficiencies ranged from 1.13 to 1.22 and were used as correction factors in our calculations.

For each test run, at least three rounds of upstream and downstream measurements were performed. Here, particle concentration downstream of each of the four metal tubes was measured before starting the next round of upstream sampling. As there were four tubes and each could hold a spacing lattice, two tubes contained lattices with a polarized, ferroelectric film material while the other two held the base (metal+PVC) as a control; the base (metal+PVC) was present for all repeats to estimate experimental variability across repeats. The tubes were sampled in random order. At least three repeats were done for each tested film type and control. This resulted in at least 18 upstream/downstream measurements per film material and control.

The entire experimental setup was located in the laminar flow hood to minimize background particle interference. All tubing was conductive and as short as possible to minimize particle loss. Similarly, all chamber components were metal except where noted above in the description of FIG. 6. The coefficient of variation of measured ARD particle concentration through the four tubes was 1.18%, 0.37% and 1.74% for the viral, bacterial and fungal sized particles, respectively, indicating uniform particle concentration across the chamber. The net charge for the ARD aerosol was indicated as current by the electrometer and its reading was (−)37.3±2.71 fA with ionizers present in the test chamber (FIG. 6).

Testing of collection efficiency as a function of air channel width

The best-performing ferroelectric polymer from the tests described above was advanced to material spacing tests. The goal here was to investigate how the different air channel widths between the polymer films would affect ARD particle collection efficiency and then to select optimum channel width for a sampler prototype. The experimental procedure was the same as that described above with two main differences. First, different sized spacing lattices were used to test air channel widths of 1.00±0.05, 2.25±0.20, 4.25±0.20, and 6.25±0.20 mm. Preliminary tests suggested that this was the range of air channel widths where a difference would emerge in particle collection efficiencies across the tested films and controls. Since the total cross sectional areas of the metal holders (FIG. 6B) were fixed, each lattice could accommodate fewer channels once the air channel width increased. To account for this difference, the average collection efficiencies were corrected for total surface area (number of channels in the setup) of the tested film material (for photographs of the lattices, see FIG. 9).

The top photograph of FIG. 9 shows from left to right the front view of the 2.25, 4.25 and 6.25 mm air channel width lattices. The 1.00 mm air channel width lattice was made by using the 2.25 mm lattice and decreasing the air channel width to 1.00 mm by increasing the amount of insulating PVC wrapped around the base. For testing the metal control in the 1.00 mm spacing lattice, three metal bases were glued together to achieve an air channel spacing distance of 1.00 mm. As can be seen in FIG. 9, the lattices had small horizontal cross supports. This allowed for more successful 3D-printing of the middle layers of the lattices, but the layers of film materials were still able to face one another through the spaces between the horizontal supports.

Second, experiments with both charge neutralized and non-charge neutralized ARD were performed. To get non-charge neutralized ARD, the ionizers were removed from the test chamber (FIG. 6), which resulted in a net charge for the ARD aerosol of (−)371.6±128.8 fA.

Again, due to differences in film thickness and the differences in air exit velocity, correction factors were applied based on downstream isoaxial inlet efficiency. The airstream velocities used throughout experiments represented a range simulating typical indoor and outdoor conditions, including occupational environments.

During each test run, all four lattices with different channel widths were loaded with the same test material and tested simultaneously (one lattice per tube). The placement of lattices was randomized. Each test run consisted of three repeated upstream/downstream measurements per lattice and it was repeated at least four times. Therefore, there were at least 12 repeated upstream to downstream measurement pairs per film material and different air channel width.

Collection and Deposition of Polystyrene Latex (PSL) Test Particles

The goal of these experiments was to determine collection efficiency and deposition location of PSL particles when using the ferroelectric film selected above.

Airborne fluorescent PSL particles with 2 μm and 5 μm (G0200 and G0500, Thermo Fisher Scientific Inc., Waltham, Mass.) diameters were used because they are within the main size ranges of interest for bioaerosol particles. Second, these particles are fluorescent and large enough to allow for direct observation by microscope on the film surface where they deposited. Experiments with each PSL particle type were performed separately, but their aerosolized average particle mass concentration per test run was similar: 2.41 to $4.17\times10^{-5}$ μg/cm$^3$.

Only lattices with 2.25 mm air channel width were used. Two diagonal lattices were loaded with clean bases and the same ferroelectric film type that was advanced to the channel width tests. One of these lattices had the positive polarization side of the film facing upwards while the other had the negative polarization side of the film facing upwards. The other two diagonal lattices held clean base controls (metal+PVC). The experimental procedure was the same as described above except collection efficiency was determined using both charge neutralized and non-charge neutralized 2 and 5 μm PSL. The collection of neutralized 2 and 5 μm PSL was performed sequentially onto the same film and then clean film and control bases were used to collect non-charge neutralized 2 and 5 μm PSL. Since each lattice holds four films (FIG. 9), the setup resulted in eight ferroelectric films and eight controls (metal+PVC) for neutralized PSL tests, and the same number for non-charge neutralized PSL tests. Each test run consisted of three upstream to downstream measurement pairs and two test runs were completed giving six repeated upstream to downstream measurements.

The number of PSL particles of each size deposited across the upward facing surfaces of the test films were counted using an epifluorescence microscope (Zeiss, Axio Imager.A1, Thornwood, N.Y.) using the 20× objective and reflected light setting. The films were marked by ink to have four equally sized (20×20 mm), square shaped quadrants (Q1-Q4) with Q1 being the front quadrant, i.e., entry point (FIG. 10). Twenty random microscope view fields were counted per quadrant. The areas of the film where the double-sided tape was located to affix the film to the base were not investigated. Thus, 80 view fields were analyzed per test film representing about 67% of the total film surface. The total number of PSL per quadrant was determined based on the view field area as described elsewhere.

The metal could not be used as a control here because of its reflective surface. The PVC-coated base was used instead since the PVC tape was matte black. The polarized, ferroelectric films were transparent and so they also had a matte black background once affixed to the base (metal+PVC).

Particle Extraction Tests

Following microscope counting of PSL particles, the efficiency of captured particle removal from the ferroelectric polymer using water-based ultrasonic agitation was investigated. Each of the bases from above was put into a 50 mL glass tube filled with autoclaved Milli-Q water. The tubes were covered with parafilm, vortex mixed for two minutes, then sonicated in an ultrasonic bath for either 8 or 40 minutes. This procedure was used as it was previously suggested to be effective and time efficient at removing captured microorganisms from filter material. Detergent was added to the ultrasonic bath water, but not to the individual glass tubes, to improve ultrasonication cleaning efficacy by reducing water surface tension and to prevent microbial contamination of the water (10 g detergent/L water, Alconox Detergent Powder, White Plains, N.Y.). After washing procedures, the bases were allowed to dry completely and then the PSL remaining on the films were recounted in the same manner as conducted above to compare pre and post washing numbers on the films' surfaces.

Statistical Analyses

Residual plots assessed statistical model assumptions for normality and homogeneity of variance. Due to unequal residual variances for some datasets, Welch's one-way analysis of variance (ANOVA) was performed to compare average particle collection efficiencies across different investigated film types and controls followed by Games-Howell multiple comparisons of means. The Welch procedure is generally applicable for simple comparisons. Individual samples t-tests were performed assuming unequal variances and two-tailed significance to compare performance of polarized, ferroelectric polymer film to a control (metal or PVC) under the same test conditions for the material spacing tests, PSL collection efficiency, and PSL removal efficiency. Univariate general linear model (GLM) was also run to investigate complex interactions between particle size and test conditions when investigating the collection efficiencies for PSL particles. All analyses were performed using SPSS Statistics Premium Edition, v23 (IBM Corporation, 2011) with $\alpha=0.05$.

Results and Discussion

Figure 12:
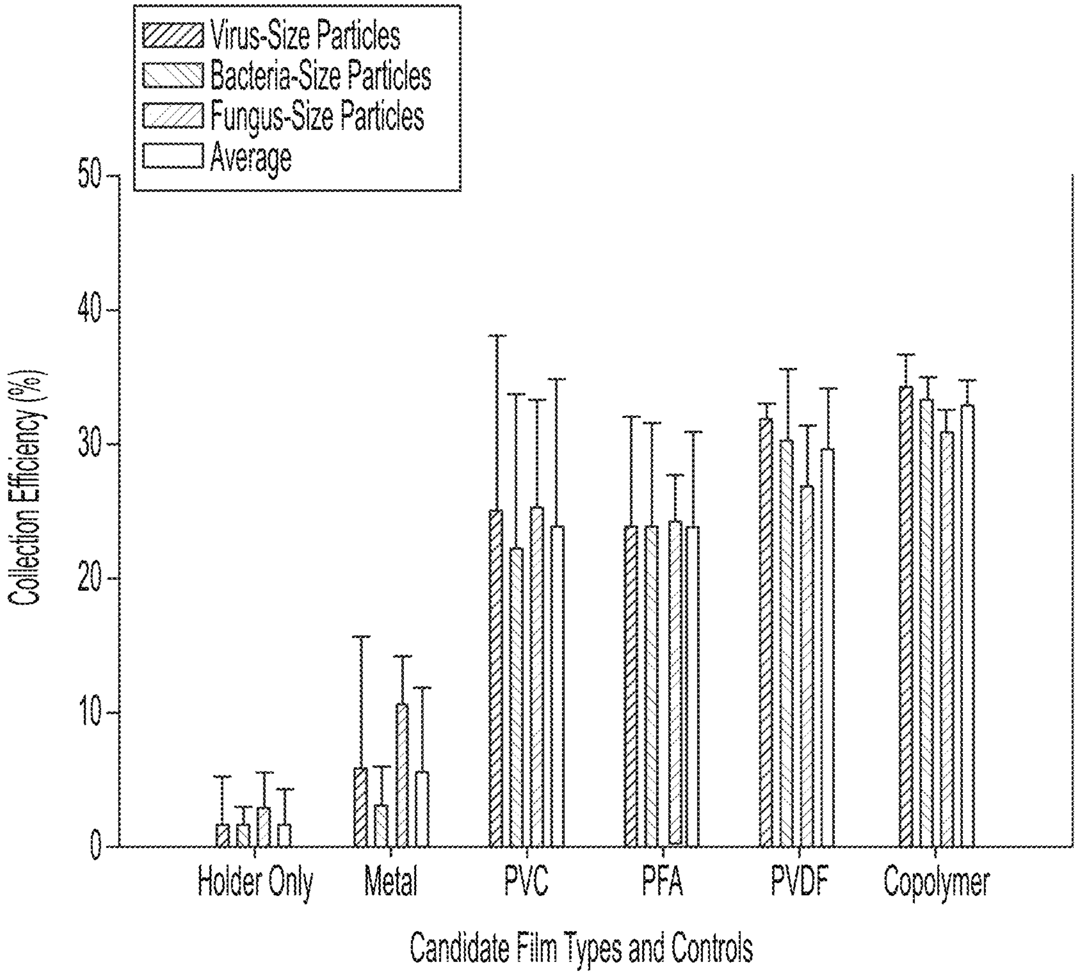
FIG. 12 is a bar graph illustrating the collection efficiencies (mean±1SD) of polarized, ferroelectric polymer films and control films across typical bioaerosol particle size ranges (viral, bacterial, and fungal-sized particles), according to the present disclosure. The size ranges are virus size=14.1 to 250.3 nm, bacteria size=259.5 to 1286 nm, and fungal size=1382 to 5048 nm.

FIG. 12 shows the particle collection efficiencies (mean±1SD) across the different bioaerosol particle size ranges produced by the ARD for polarized polymer films and controls when using the same air channel width (2.25 mm). As a conservative approach, test particles were charge neutralized for these experiments to exhibit Boltzmann charge equilibrium. The final dataset was comprised of the following number of upstream to downstream sample measurement pairs per film type and control: lattice only (n=32), metal control (n=24), PVC control (n=136), PFA control (n=18), PVDF (n=18) and copolymer (n=9). The copolymer used was likely of low molecular weight, which made it very brittle and difficult to handle without tearing; therefore, only nine repeat measurements were taken. Due to its fragility, the material was deemed unsuitable for advancement to the next tests.

One-way ANOVA for differences in particle collection efficiencies as a function of particle size range (virus, bacterial and fungal-sized particles) showed no statistically significant difference (Welch's $F(2, 133.292)=1.049$, $p=0.353$). As there was no significant effect of particle size on collection efficiency, the average collection efficiencies for all particle size ranges were pooled and investigated as a function of tested materials: two polarized, ferroelectric polymer film types and four controls. One way ANOVA showed statistical significance (Welch's F(5, 51.087)=348.201, p<0.001).

Games-Howell post-hoc test showed that the PVC and PFA controls and both polarized polymers had statistically significantly greater collection efficiency than the empty spacing lattice and lattice with metal control (p<0.001). The average total collection efficiencies of the empty spacing lattice and metal control were 1.68±2.60% and 5.61±6.17%, respectively. The average particle collection efficiencies for the PVC (23.80±11.07%) and PFA (23.89±6.90%) control films were not statistically significantly different (p>0.05). The polarized, ferroelectric polymers, PVDF and copolymer, had average particle collection efficiencies of 29.59±4.67% and 32.88±1.99%, respectively, and were statistically significantly greater than all control types (p<0.05), but were not significantly different from each other.

The PVC and PFA films increased the average particle collection over the metal control by 18.23±0.06% (on the absolute scale). This may be due to the presence of a surface charge on these insulating materials that enabled the capture of those weakly charged particles that traveled close to the film. Previous research investigating submicron particle flow through parallel-plate microchannels suggests that particle flux to the walls of channels is strongly influenced by attractive surface interactions between oppositely charged particles and channel surfaces; these interactions include diffusion and electrical double-layer forces. However, accumulation of surface charge on these materials is a stochastic process and cannot be relied on for continuous bioaerosol sampling.

The use of the polarized, ferroelectric polymers increased particle collection efficiency over the PVC and PFA control films by an additional 13.00±2.33% (on an absolute scale) resulting in average collection efficiency for ferroelectric films of 30.69±4.23%. This increased collection efficiency is due to the effect of film polarization. Electrets have been previously designed and successfully used for passive aerosol sampling. These electrets have been reported as being permanently polarized, but this is incorrect for corona poled polypropylene material. Corona poled polypropylene is well known for its ability to store electrical charge which produces an attractive electric field at its surface. However, as this electric field results from charge injection, it will fade throughout use as the charge is neutralized by captured particles and recombination. Also, it can only attract particles with one sign of charge.

In contrast, PVDF and its copolymers with TrFE can maintain their polarizations and, therefore, their surface electric fields, until heated above their Curie temperatures. For active bioaerosol sampling, this can provide more predictable, sustainable collection efficiency throughout use in the field over long-term sampling durations. Electrets previously designed for passive aerosol sampling placed a conducting grid close to the surface of the electret-forming material as dust capture requires an electric field external to the electret. On the other hand, for polarized ferroelectric films, like PVDF, one side of the polarized film has a positive electric field associated with the film surface and the other side a negative electric field. Bringing the oppositely polarized sides of the film layers close enough together will result in the continuation of a constant electric field from one film to the other across the air channel.

Figure 13:
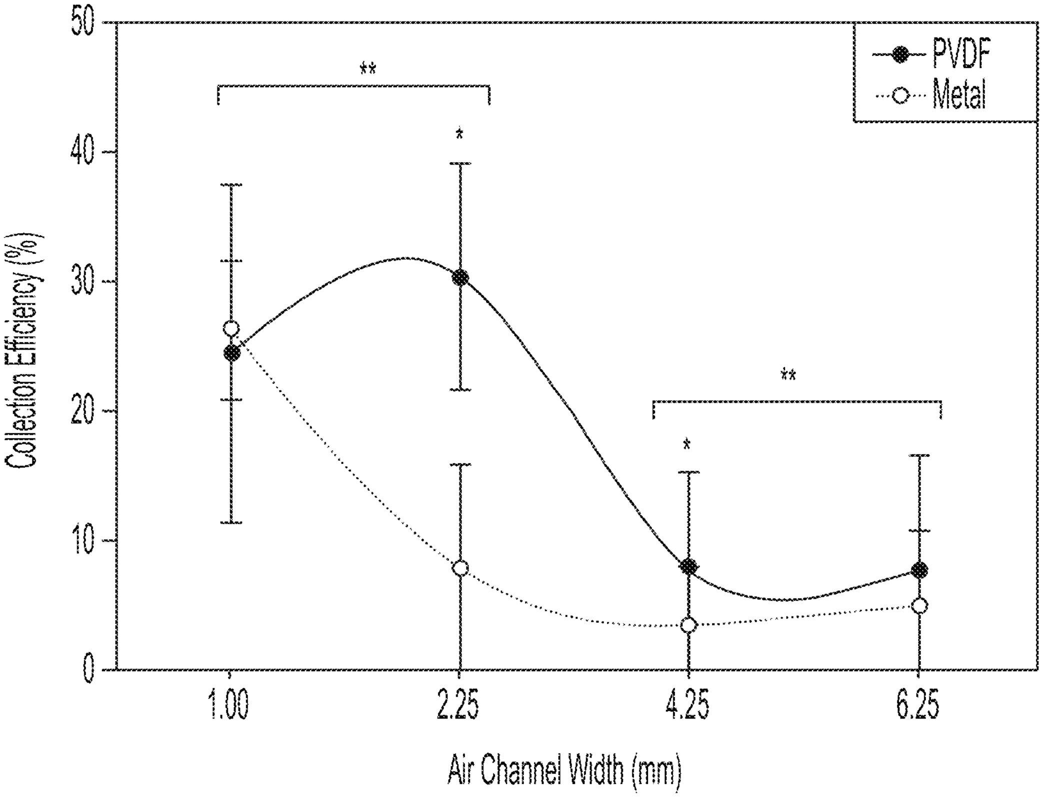
FIG. 13 is a graph illustrating particle collection efficiencies (mean±1SD) of Arizona Road Dust (ARD) for poly (vinylidene fluoride) (PVDF) versus metal control using air channel widths ranging from 1.00 to 6.25 mm, according to the present disclosure.

Thus, the next goal of this research was to investigate the particle collection efficiency of paired layers of ferroelectric film as a function of air channel width. Since PVDF film showed the highest collection efficiency and the copolymer we obtained was found not to be suitable due to its fragility, PVDF was advanced to the next round of testing. FIG. 13 illustrates the particle collection efficiencies (mean±1SD) for neutralized and non-charge neutralized ARD at air channel widths ranging from 1.00 to 6.25 mm for PVDF and the metal control. A "*" indicates statistically significant difference between the mean particle collection efficiency for PVDF versus metal control at a given air channel width (p<0.05). An independent samples t-test (equal variances not assumed) showed no statistically significant effect of ARD charge state on collection efficiencies measured across air channel widths for the PVDF and metal (t(169.692)=0.82, p=0.935). Therefore, to increase statistical power, collection efficiencies of the neutralized and non-charge neutralized ARD were pooled to represent an aerosol population with particles both carrying high and low electrical charge. For environmental sampling, such an aerosol population would be representative of freshly aerosolized and aged particle mix. Once the collection efficiency data from neutralized and non-charge neutralized ARD were pooled, the total number of upstream to downstream repeated measurement pairs were 96 and 144 for the PVDF and metal, respectively. For PVDF, there were 24 repeats per each air channel width. For metal control, there were 60, 36, 24 and 24 repeats at 1.00, 2.25, 4.25 and 6.25 mm air channel widths, respectively. At the smaller channel widths (i.e. ≤2.25 mm), higher turbulence was expected and so a higher number of repeats were performed to improve estimates of variability for the control.

At each channel width, t-tests were performed to compare the collection efficiencies of the PVDF and metal control. PVDF resulted in a statistically significantly greater particle collection efficiency than metal at 2.25 mm channel width (t(46)=2.013, p<0.001) and 4.25 mm width (t(38)=2.024, p=0.02), but not at widths of 1.00 mm (t(26)=2.056, p=0.53) or 6.25 mm (440)=2.021, p=0.18). As per Welch's ANOVA, channel width was a statistically significant factor in collection efficiency of ARD by the PVDF (Welch's F(3, 50.453)=40.094, p<0.001). As shown by "**", Games-Howell post hoc test revealed that average collection efficiencies obtained when using both the 1.00 and 2.25 mm air channel widths were statistically significantly greater than those using the 4.25 and 6.25 mm widths (p<0.05), but were not significantly different from each other (p>0.05).

Thus, it appears that the collection efficiency of PVDF is statistically significantly greater between about 2.25 and 4.25 mm air channel width compared to the metal control. At widths ≥6.25 mm, the strength of electric field created between the parallel PVDF films is no longer sufficient to provide a significant improvement in particle collection efficiency due to gravity and surface effects. At a distance of 1.00 mm, the collection efficiencies of the PVDF and metal were again not statistically significantly different. Previous research suggests that particle flux will increase as the air channel's surface boundary layer becomes comparable to distances over which attractive surface interactions dominate. Thus, for the air channel width of 1.00 mm, electrostatic attraction does not provide enhanced collection over micro-turbulence and particle-surface interactions. In addition, air channel width of 1.00 mm provides restrictions of airflow and would not be practical for active sampling where one would rely on free air movement between the layers of PVDF films. Based on data in FIG. 13, it is apparent that PVDF films separated by an air channel of 2.25 mm perform the best and this distance was used in further tests.

Figure 14:
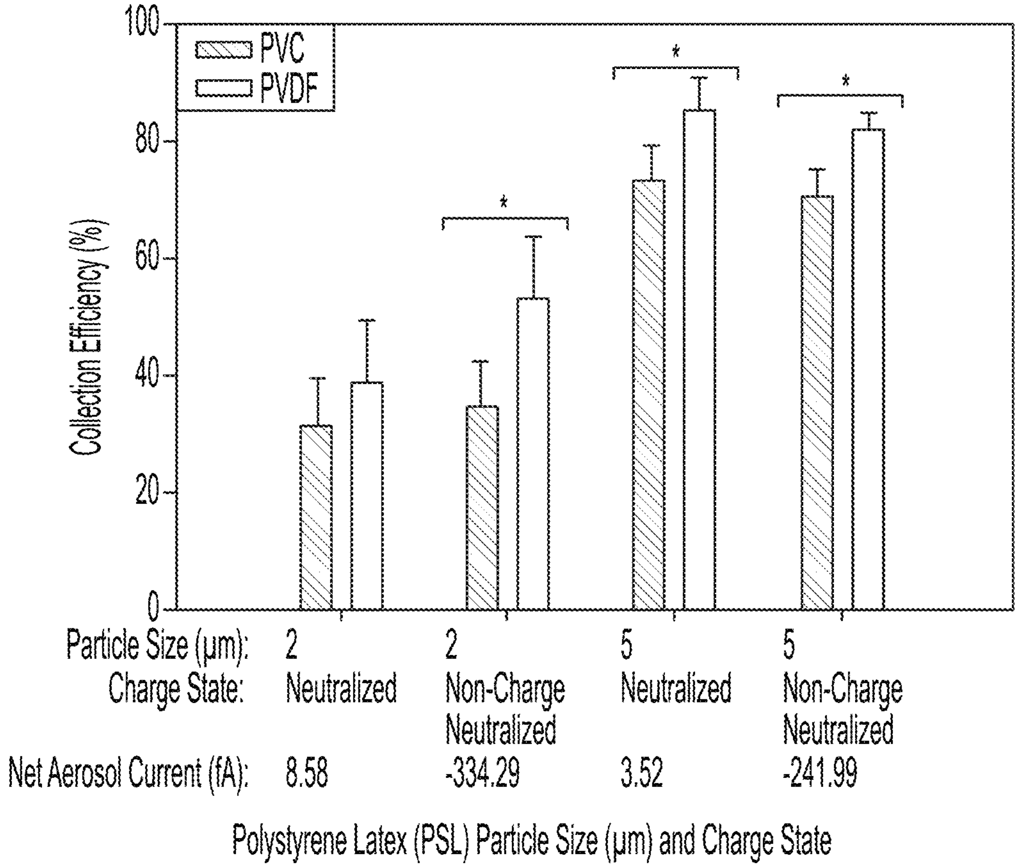
FIG. 14 is a bar graph illustrating the collection efficiency (mean±1SD) of neutralized and non-charge neutralized polystyrene latex (PSL) test particles (2 and 5 μm diameter) captured using either PVDF or poly(vinyl chloride) (PVC) control, according to the present disclosure.

FIG. 14 shows the collection efficiencies (mean±1SD) of neutralized and non-charge neutralized PSL test particles for PVDF versus the PVC control. As described above, PVC was used to insulate the metal base. As per selection above, air channel width of 2.25 mm was used for experiments in FIG. 14. A "*" indicates statistically significant difference between PVDF and PVC collection efficiency for a given test particle size and charge state. The collection efficiencies of the PVDF and PVC were compared in four distinct tests: charge neutralized and non-charge neutralized PSL particles of 2 and 5 μm. There were six total repeated upstream to downstream measurements used to compute collection efficiencies for each of the four test types.

Individual t-tests were used to assess differences in PVDF and PVC performance for each particle type. For charge-neutralized 2 μm PSL, the collection efficiencies of the PVC and PVDF were not statistically significantly different ($t(10)=1.391$, $p=0.194$). For non-charge neutralized 2 μm PSL as well as both neutralized and non-charge neutralized 5 μm PSL, the PVDF collection efficiency was statistically significantly greater than PVC's: $t(10)=3.451$, $p<0.05$, $t(10)=3.585$, $p<0.05$, and $t(10)=5.796$, $p<0.001$, respectively. A univariate GLM was run to assess prediction of particle collection efficiency including terms for PSL size (2 and 5 μm), PSL charge state (neutralized and non-neutralized), and film type (PVC and PVDF). The overall corrected model was statistically significant ($F(7)=53.871$, $p<0.001$, $R^2=0.904$, adjusted $R^2=0.887$). Significant predictor terms included: PSL size ($F(1)=330.544$, $p<0.001$), film type ($F(1)=33.576$, $p<0.001$) and the interaction term between PSL size and PSL charge state ($F(1)=7.451$, $p<0.05$).

Figure 17:
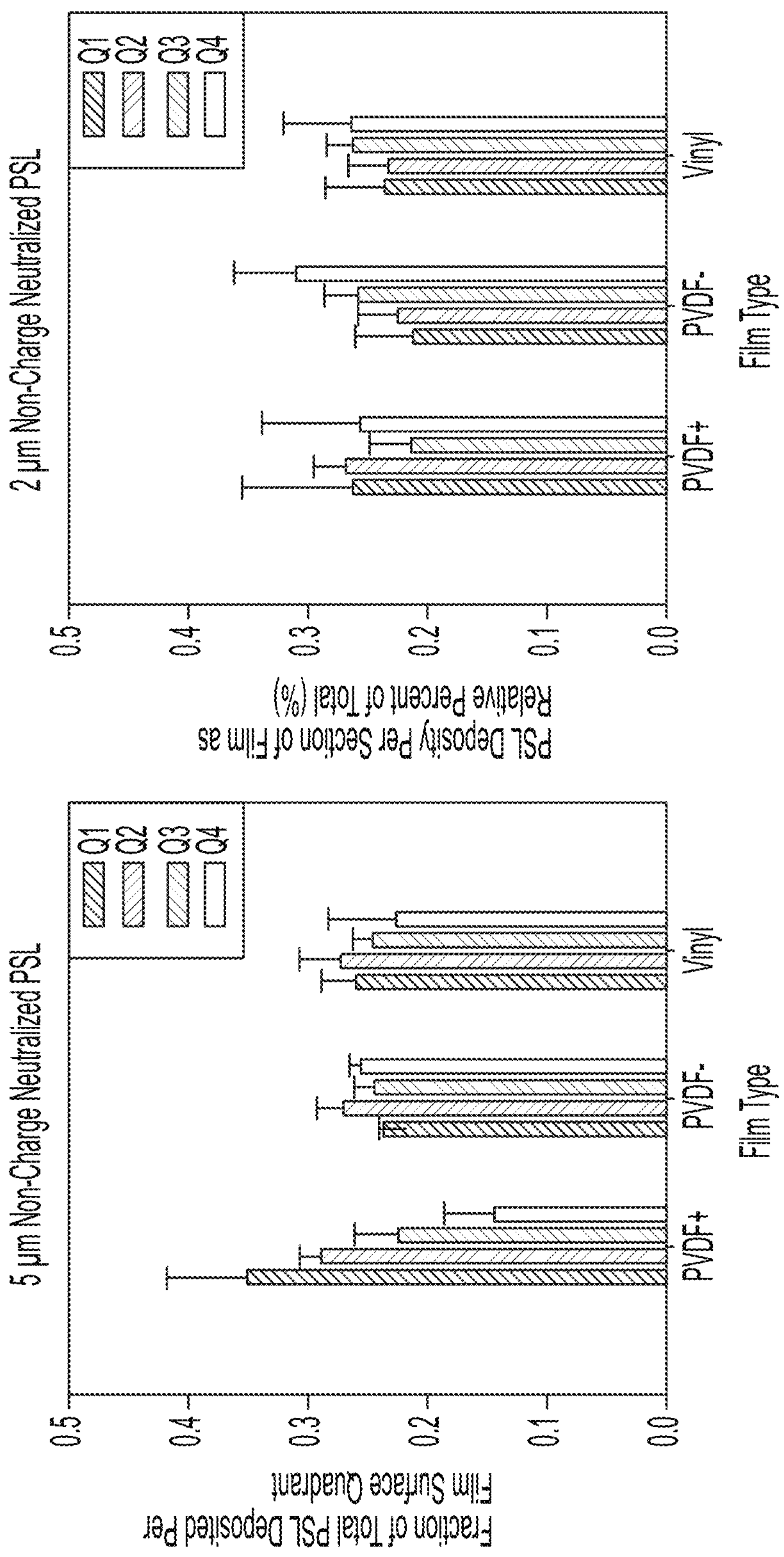
FIG. 17 shows bar graphs illustrating the surface deposition of non-charge neutralized PSL (2 and 5 μm) per quadrant on the surface of positive and negative polarization sides of PVDF films and PVC control films, according to the present disclosure.

These results indicate, as hypothesized, that polarized, ferroelectric PVDF films significantly enhanced particle collection efficiency when the test particles carried a higher electrostatic charge. Under Boltzmann charge equilibrium, larger particles tend to carry higher charge. Therefore, even under Boltzmann charge equilibrium, the 5 μm PSL particles are expected, on average, to carry a higher number of charges per particle. Furthermore, a higher number of non-charge neutralized 5 μm PSL deposited on the positive polarization side of the PVDF near the point of entry into the film lattice (FIG. 17). Referring to FIG. 17, the PSL particle counts are represented as a fraction of the total particles on a film's surface deposited in the quadrants, Q1 to Q4. Q1 represents the front of the film where particles enter the lattice while Q4 is the back of the film. PSL was counted by microscope. The 2 μm PSL tended to uniformly deposit across the surface of all of the films. The 5 μm PSL, however, was strongly frontloaded on the positive polarization side of the PVDF. This further supports the conclusion that the PVDF films enhanced collection of particles with opposite polarity to the film surface.

Another factor that has likely affected the results was the capture of particles by the 3D-printed lattices themselves. Preliminary tests performed with 1 μm PSL test particles indicated that the loss of non-charge neutralized PSL when flowing through the empty spacing lattices was as high as 55% (data not shown). This result suggests that the 3D-print material may be a candidate for producing the field deployable active bioaerosol sampler because it enhances capture of charged particles in addition to their capture by the PVDF films. However, for this approach to be feasible in field sampling, the lattice has to be designed and integrated with the PVDF film in a way that allows for convenient and simple particle extraction from both the film and the film holder (lattice).

Figure 15:
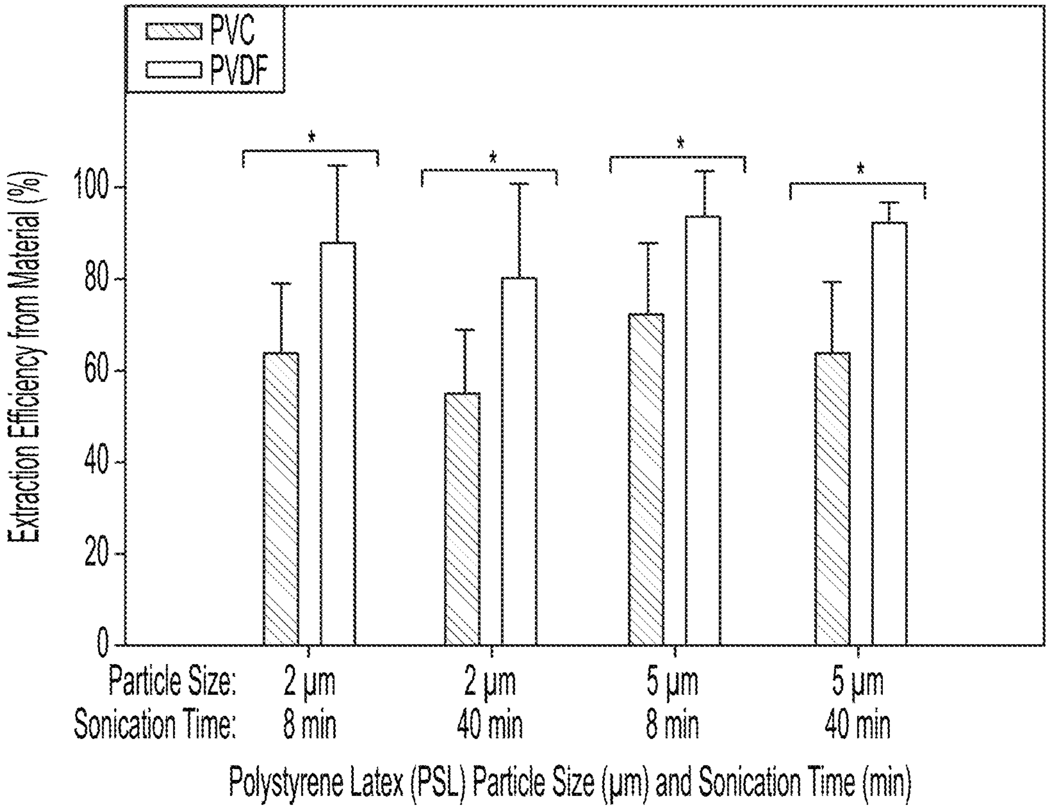
FIG. 15 is a bar graph illustrating the extraction efficiencies (mean±1SD) of polystyrene latex (PSL) test particles (2 and 5 μm) from PVDF and PVC control using two different ultrasonic bath times: 8 versus 40 minutes, according to the present disclosure.

The extraction efficiencies (mean±1SD) of the PSL test particles deposited on the PVDF and PVC (control) films using liquid-based ultrasonic agitation are presented in FIG. 15. A "*" indicates a statistically significant difference between particle extraction efficiency from PVDF and PVC for a given particle size and ultrasonication time. As per t-test, the average PSL extraction efficiencies were statistically significantly greater from PVDF than from PVC for all tested conditions: 2 and 5 μm PSL and 8 and 40 minute sonication times. For 2 μm PSL and 8 and 40 minute sonication times, respectively: $t(14)=2.881$, $p<0.05$ and $t(14)=2.827$, $p<0.05$. For 5 μm PSL and 8 and 40 minute sonication times, respectively, the t-test results were: $t(14)=3.181$, $p<0.05$ and $t(14)=5.006$, $p<0.001$. Independent samples t-test revealed no statistically significant difference between 8 and 40 minute sonication times across the two film types and particle sizes which suggests that particles deposited on PVDF films can be efficiently removed after 8 minutes ($t(61.389)=1.351$, $p=0.182$); thus, a shorter removal time can be used. Data in FIG. 15 show that up to 100% of particles deposited on PVDF films could be extracted for subsequent analysis. This is important for future sampler development as the particle extraction efficiency affects representativeness of the sample. Moreover, this was achieved even with non-charge neutralized PSL particles, which carried a high net charge upon aerosolization (FIG. 14) and would experience strong electrostatic attraction once deposited on the polarized PVDF films. However, even in this scenario, the particles were efficiently removed suggesting that the collected biological particles would be effectively removed as well. The extraction efficiency of surface deposited microorganisms will be addressed in subsequent studies.

CONCLUSION

This research investigates the application of permanently polarized ferroelectric polymer films for active bioaerosol sampling in the first stages of designing a sampler concept. A polarized, ferroelectric polymer, PVDF, was found to provide statistically significantly greater collection efficiency than controls for particles exhibiting Boltzmann charge equilibrium ranging in size from 14 nm to 5 μm. This represents typical sizes of viral, bacterial and fungal particles. The charged airborne particles are captured by the electrostatic field created between parallel, oppositely polarized surfaces of the ferroelectric polymer films when particles flow through air channels that are 2.25 to 4.25 mm wide. The range of air flow velocities used in these experiments represents typical air velocities in indoor (including occupational) and outdoor spaces.

While electret materials have been previously used in passive aerosol sampling, these materials will lose their charge during use as charged particles deposit onto the collection surface. In contrast, polarized PVDF films maintain permanent electric fields at typical environmental temperatures and thus could be applied for long-term bioaerosol sampling without degradation of their performance. Also, charged PSL particles deposited onto the PVDF film surface were removed from the films with 100% efficiency indicating minimal sample loss during post-sampling extraction.

PVDF advanced to the next round of active bioaerosol sampler development focusing on prototyping and testing different field-deployable sampler designs under controlled laboratory conditions with different types of microorganisms. This disclosure provides a conceptual framework for the active bioaerosol sampler's design and development. Ultimately, this sampler will provide a new tool for bioaerosol research. Applying polarized, ferroelectric polymer films for active bioaerosol sampling expands possibilities for performing long-term sampling and exposure assessment to better understand how airborne biological particles influence health and the environment. Accordingly, these films can be integrated with air moving devices (e.g. pumps, fans) as a type of electrostatic precipitator that does not need power for particle charging or collection. This would provide a low power option for active bioaerosol sampling without production of ozone.

Several of the features and functions disclosed above may be combined into different apparatus, systems or methods, or combinations of apparatus, systems and methods. Various presently unforeseen or unanticipated alternatives, modifications, variations or improvements therein may be subsequently made by those skilled in the art, each of which are also intended to be encompassed by the present disclosure and following claims.

What is claimed is:

1. A passive sampler for airborne particulate sampling, the sampler comprising:

a sampler base portion of variable size and shape, including a plurality of air channels having variable air channel spacing therethrough, wherein the plurality of air channels are configured to electrostatically capture particles entering the air channels;

one or more ferroelectric films, wherein each of the one or more ferroelectric films has a first side and a second side polarized by application of an external electric field, wherein, for each of the one or more ferroelectric films, the first side produces a negative electric field at a first surface and the second side produces a positive electric field at a second surface, wherein the one or more ferroelectric films are coupled to opposing inner surfaces of each of the plurality of air channels with their opposite polarization directions facing each other across an air channel gap formed by a space between opposing ferroelectric films and configured to collect both charged and uncharged particles.

2. The sampler of claim 1, wherein the one or more ferroelectric films are disposed on the sampler base portion in a spiral orientation with optimal air channel spacing between each ferroelectric film.

3. The sampler of claim 1, wherein the one or more ferroelectric films have a parallel orientation when disposed on an inner surface of the sampler base portion having a lattice configuration.

4. The sampler of claim 1, wherein the one or more ferroelectric films are uniaxially oriented poly(vinylidene fluoride) (PVDF) or its copolymers with trifluoroethylene, or other polarized or non-polarized ferroelectric materials, such as ceramic and composite ferroelectric materials.

5. The sampler of claim 1, wherein the air channel spacing is optimally set between 2 mm and 3 mm for improved charged particle collection.

6. The sampler of claim 1, wherein the sampler base portion is manufactured by 3D printing or injection molding.

7. The sampler of claim 1, wherein the sampler is configured for use individually or grouped together as a unit indoors and outdoors or the sampler is configured to be worn as a personal sampler.

* * * * *